US012717566B2

(12) United States Patent
Liu et al.

(10) Patent No.: US 12,717,566 B2
(45) Date of Patent: Aug. 25, 2026

(54) RECOMMENDING VERSION UPDATES FOR SOFTWARE PACKAGES

(71) Applicant: Fujitsu Limited, Kanagawa (JP)

(72) Inventors: Lei Liu, San Jose, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 17/937,420

(22) Filed: Sep. 30, 2022

(65) Prior Publication Data

US 2024/0111512 A1 Apr. 4, 2024

(51) Int. Cl.
*G06F 8/65* (2018.01)
*G06F 21/57* (2013.01)

(52) U.S. Cl.
CPC .............. *G06F 8/65* (2013.01); *G06F 21/577* (2013.01); *G06F 2221/033* (2013.01)

(58) Field of Classification Search
CPC ..................................... G06F 8/65; G06F 8/71
See application file for complete search history.

(56) References Cited

U.S. PATENT DOCUMENTS 9,383,992 B2 7/2016 Nigul
10,007,510 B2 6/2018 Gilbert et al.
10,263,844 B1 * 4/2019 Wu ......................... G06F 8/654
10,635,566 B1 * 4/2020 Talluri ................ G06F 11/3409
10,990,373 B2 * 4/2021 Olderdissen .............. G06F 8/71
11,531,660 B2 * 12/2022 Wilton .................. G06F 16/219
2009/0328025 A1 * 12/2009 Johnson .................... G06F 8/71 717/170
2011/0078674 A1 * 3/2011 Ershov ...................... G06F 8/75 717/170
2019/0114165 A1 * 4/2019 Ghiondea ................. G06F 8/71
2020/0242254 A1 * 7/2020 Velur .................... G06F 21/552
2021/0149658 A1 * 5/2021 Cannon .................... G06N 3/04

(Continued)

OTHER PUBLICATIONS

Lee John & Ihara Akinori & Monden Akito & Matsumoto, Ken-ichi. (2013). Patch Reviewer Recommendation in OSS Projects. Proceedings—Asia-Pacific Software Engineering Conference, APSEC. 2. 1-6. 10.1109/APSEC.2013.103.

(Continued)

*Primary Examiner* — Duy Khoung T Nguyen
(74) *Attorney, Agent, or Firm* — Fujitsu Intellectual Property Center

(57) ABSTRACT

According to an aspect of an embodiment, operations for recommending version updates for software packages are provided. The operations may include receiving an input which indicates a usage of a first version of a first software package inside a source code of a software and determining a second version of the first software package. The operations may further include selecting one or more constraints from a set of constraints and executing a set of checks based on the selected constraints to determine a suitability of the second version as an update for the first version. The set of constraints may include a security constraint, a backward compatibility constraint, an interoperability constraint, and a performance constraint. The operations may further include controlling an electronic device to render user-assistive information that includes a recommendation to update the first version to the second version.

18 Claims, 15 Drawing Sheets

(56) References Cited

U.S. PATENT DOCUMENTS

2022/0405091 A1* 12/2022 Mahanta .................. G06N 3/10
2024/0095012 A1* 3/2024 Jain ..................... H04L 41/0883

OTHER PUBLICATIONS

C. Fu M. Zhou Q. Xuan and H. -X. Hu, "Expert recommendation in oss projects based on knowledge embedding," 2017 International Workshop on Complex Systems and Networks (IWCSN), Doha, Qatar, 2017, pp. 149-155, doi: 10.1109/IWCSN.2017.8276520.
Bachwani Rekha, Olivier Crameri and Ricardo Bianchini "Mojave: A recommendation system for software upgrades." (2012); retrieved from https://www.usenix.org/system/files/mad12-final11.pdf.

* cited by examiner

RECOMMENDING VERSION UPDATES FOR SOFTWARE PACKAGES

FIELD

The embodiments discussed in the present disclosure are related to recommending version updates for software packages.

BACKGROUND

In software development, version control is an important practice that helps to keep track of changes in a source code of a software package (e.g., an open-source software package). Typically, developers and organizations publish documents that detail changes introduced in the source code of a newer version of their software package in comparison to previous version(s) of the software package. The software package may be updated to a new version to add new functionalities, replace, or remove existing functionalities, and to fix security issues such as bugs/exceptions raised in the older versions of the source code of the software package. Typically, the software package includes methods or functions that a user may use in a source code of his/her own software application. For example, the software package may expose methods that may be called by executing Application Programming Interface (API) calls, including the source code of the software application.

With a release of a newer version, the software package may include changes in the source code. For example, the methods exposed in an older version of the software package may change in the newer version. In some instances, such changes may break the backward compatibility of the software. Any software application that invokes such methods may not function appropriately with the newer version until relevant changes are made in the source code of the software application. In some instances, the software application may encounter errors or may crash. In other instances, the newer version of the software package may further break interoperability with other software used in the application or may have security (e.g., vulnerabilities) or performance issues associated with it.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving an input which indicates usage of a first version of a first software package inside a source code of a software. The operations may further include determining a second version of the first software package with a public release date that is before or after a public release date of the first version of the first software package. The operations may further include selecting one or more constraints from a set of constraints that includes a security constraint, a compatibility constraint, an interoperability constraint, and a performance constraint. The operations may further include executing a set of checks based on the selected one or more constraints to determine a suitability of the second version as an update for the first version. The operations may further include controlling an electronic device to render user-assistive information that includes a recommendation to update the first version to the second version. The user-assistive information may be rendered based on the suitability.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
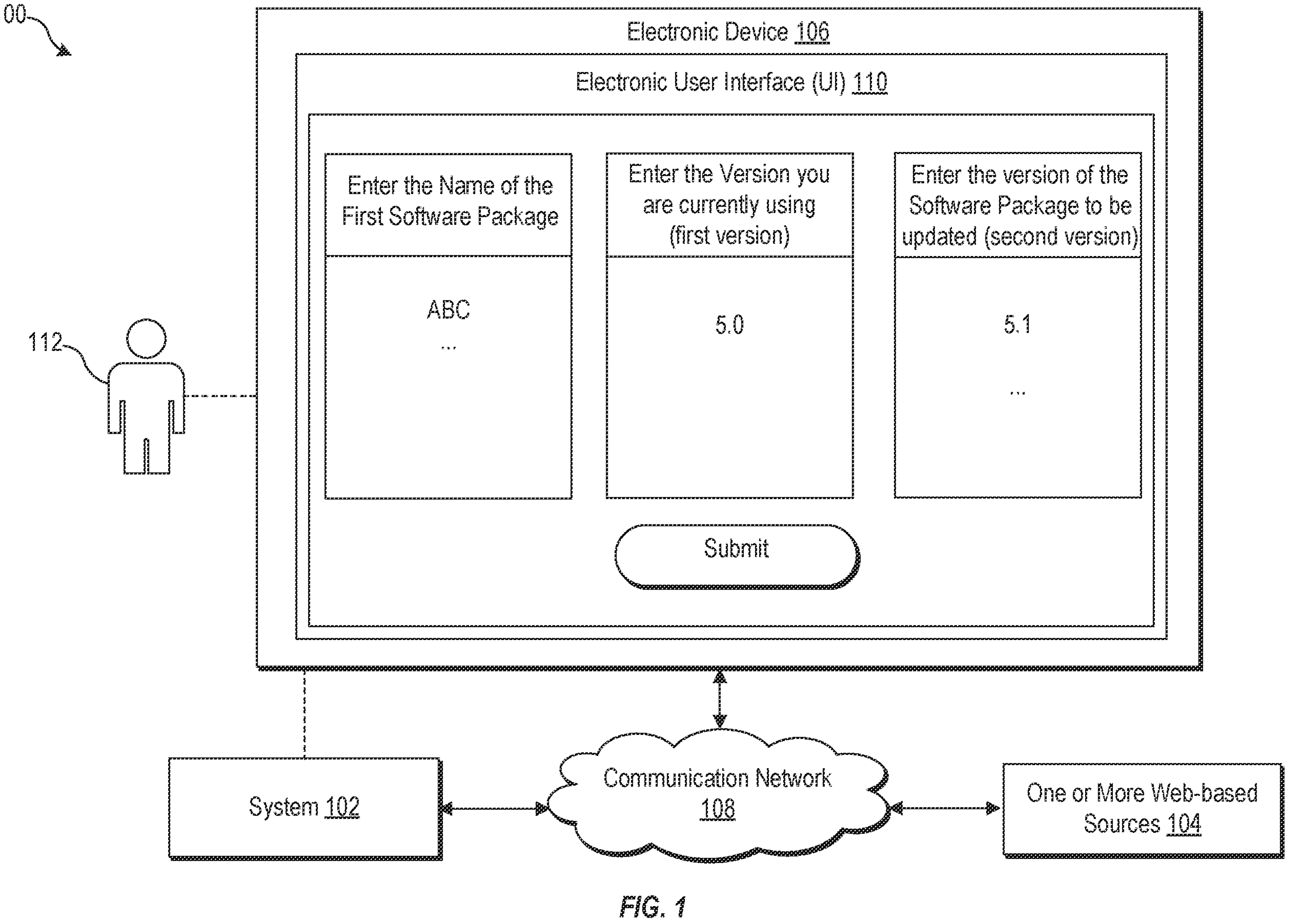
FIG. 1 is a diagram representing an exemplary environment related to recommending version updates for software packages.

All according to at least one embodiment described in the present disclosure.

DESCRIPTION OF EMBODIMENTS

Open-Source Software (OSS) is becoming more important in the current industry. Web-based software package hosting systems, such as GitHub® have a large community of developers and organizations for building and sharing open-source software. The open-source software is used by various client applications with the help of APIs that allow interaction between a client application and the open-source software. With a vast number of developers and organizations, the open-source software is updated frequently. In certain cases, after updating the OSS, the APIs may not work in the required manner or may not work at all. In some instances, the updated OSS may have security issues, interoperability issues, or even performance issues associated with it. This may lead to the unavailability of one or more functions in the client application to users of the client application or even the crashing of the client application.

With a rapid increase in the number of updates to the OSS, the OSS may provide more functionalities that may be consumed via APIs and may be integrated into the client application. In some cases, these updates to the OSS may fix some security issues that occurred in the previous versions of the OSS. The client (or the developer) may want to update the current version of the OSS used in the client application to improve the security and/or enhance the functionality of the client application.

Before upgrading the OSS, the client may want to know whether the API (or the upgraded OSS) is compatible with a current version of the OSS or not. In general, a newer version of the software is said to be compatible (or backward compatible) if the software application using the API of the current version of the software can work with the newer version of the software. An API may be said to be compatible if the client application (a program written to consume the API) that works with one version of the API can work the same way with future versions of the API. In other words, the API is backward compatible between releases if the clients are able to work with a new version of the API seamlessly (i.e., without any modification in a source code of the client application). Also, before upgrading the OSS, the client may want to know whether the API is interoperable with API's of another open-source software used by the client application or not. In general, interoperability refers to a co-existence (i.e. unanimous execution) of a first API of a first OSS with at least a second API of the second OSS. In case, the API is not interoperable, then the source code of the client application may have to be updated. This may be cumbersome as well as time-consuming. Moreover, before upgrading the OSS, the client may wish to know whether the updated OSS has security vulnerabilities or not. Also, the client may want to know whether the updated OSS has some performance improvements and new features before upgrading the OSS.

Traditional approaches for recommendations of software (or OSS) updates require manual effort in checking all the pre-requisites such as security issues check, compatibility check, interoperability checks, and performance checks. For example, the client may have to manually check for security issues in the newer version of the OSS based on an analysis of the code of the newer version or based on user reviews received by other users of the newer version of the software application or from vulnerability databases. As another example, for compatibility checks and/or interoperability checks, the client may have to update the client application with the newer version of the software in a sandbox environment to detect the compatibility and interoperability checks. Such approaches for manually checking each pre-requisite may be cumbersome, time-consuming, and subjected to human errors.

Some embodiments described in the present disclosure relate to a method and a non-transitory computer-readable medium for recommending version updates for software packages. The disclosed system may be capable of recommending the newer version of the software package to be used in the client application. Moreover, the disclosed system may use at least two decision parameters to check whether the API should be recommended or not. A first decision parameter may be associated with security issues associated with the current version and the newer version of the software package. A second decision parameter may be associated with a compatibility of the newer version of the software package with the current version of software package. Additionally, a third decision parameter may be associated with interoperability of the newer version of the software package with other software packages used in the client application and a fourth decision parameter may be associated with a performance of the newer version of the software package with respect to the previous version of the software package. In case the newer version is not recommended, the disclosed system may be capable of displaying one or more reasons in a natural language for not recommending the newer version of the software package. Therefore, the disclosed system may recommend the newer version of the software package based on two or more decision parameters. Also, the disclosed system may define comprehensive rules and procedures associated with each decision parameter for recommending the newer version of the software package. The present disclosure may be useful for the developers of the software application who may want to update to the newer version of the software. Also, the developer may be informed about whether the source code of the software application needs to be modified after updating to the newer version of the software.

Embodiments of the present disclosure are explained with reference to the accompanying drawings.

FIG. 1 is a diagram representing an exemplary environment related to recommending version updates for software packages, arranged in accordance with at least one embodiment described in the present disclosure. With reference to FIG. 1, there is shown an example environment 100. In the example environment 100, there is shown a system 102 and one or more web-based sources 104. The one or more web-based sources 104 may host a collection of software packages or store data associated with the collection of software packages. There is further shown an electronic device 106, a communication network 108, and an electronic user interface (UI) 110 rendered onto a display screen of the electronic device 106. The system 102, the one or more web-based sources 104, and the electronic device 106 may be communicatively coupled to each other, via the communication network 108.

There is further shown a user 112 who may be associated with the electronic device 106. The electronic device 106 may include suitable logic, circuitry, and interfaces that may be configured to receive input(s) from the user 112 and render user-assistive information on the electronic UI 110. In an embodiment, the electronic device 106 may be a touch screen which may enable the user 112 to provide one or more inputs via the electronic UI 110 rendered on the electronic device 106. The touch screen may be at least one of a resistive touch screen, a capacitive touch screen, or a thermal touch screen. The electronic device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the electronic device 106 may refer to a display screen of a head mounted device (HMD), a smart-glass device, a see-through display, a projection-based display, an electro-chromic display, or a transparent display.

In an embodiment, the electronic device 106 may correspond to a user device associated with the user 112. The user 112 may interact with the system 102 via the user device. Examples of the electronic device 106 may include, but are not limited to, a mobile device, a desktop computer, a laptop, a computer workstation, a server, such as a cloud server, or a group of servers. In one or more embodiments, the user device may include a user-end terminal device and a server communicatively coupled to the user-end terminal device. Examples of the user-end terminal device may include, but are not limited to, a mobile device, a desktop computer, a laptop, or a computer workstation.

The one or more web-based sources 104 may include suitable logic, circuitry, and interfaces that may be configured to store information associated with a collection of software packages. Each software package in the collection of software packages may be used for application development. In an embodiment, the software package may expose or provide one or more APIs. Specifically, the user 112 may have to include API call codes or methods of the API in a source code of their software. Each software package in the collection may correspond to, for example, an OSS, a Free and Open-Source Software (FOSS), a Free/Libre and Open-Source Software (FLOSS), or a Proprietary software. Examples of the one or more web-based sources 104 may include, but are not limited to, a web-based code hosting server, a database server, a file server, a web server, a Really Simple Syndication (RSS) feed, and a server that hosts website(s) and web application(s).

In an embodiment, the one or more web-based sources 104 may be implemented as servers, which may include storage distributed across one or more availability zones (e.g., datacenters). In another embodiment, each web-based source may include a front-end system and a back-end system. The front-end system may be configured to provide an interface (such as webpages or a client-side interface of a web-application) to view information associated with a software. The back-end system may store databases, logic, and instructions to process requests by the front-end system to access the information associated with the software.

In an embodiment, the one or more web-based sources 104 may host a software package (or the collection of software packages) and may allow individuals and/or organizations to manage the software through a web-based interface. In another embodiment, the web-based source may be a software package hosting system which includes webpages on a software package. The webpages may include links to a source code (if the software is OSS) of the software package and other software-related files, such as a documentation, a changelog, a readme file with a description of the corresponding software package, test results, API reference guide, and other additional links or references. Users (including the user 112) may be able to access the collection of software packages through an API call, a web-client (for example, a web browser), or a command-line interface.

The user 112 may be a developer (or a group of developers) of a software. The software may be using one or more first APIs or first functions in the source code of the software. For example, the source code may include an API call code or a function code corresponding to specific operations or tasks of the software. Such APIs or functions may be provided by a first version of a first software package, which may be hosted on the one or more web-based sources 104.

At any-time, a second version of the first software package that provides the one or more APIs or functions may be released. The user 112 may want to update the first software package from the first version to a second version. The second version of the first software package may include changes in the source code of the first version of the first software package. For example, the changes may include a modification in function/method definitions and number and type of I/O parameters for functions, deprecation of existing functions, and the addition of new API methods or functions. In some instances, the changes may include syntax-related changes that may be introduced in the second version if the first version is upgraded to support a newer version of a programming language. Some of the changes may be fixes introduced in the second version of the software package to remove security issues such as vulnerabilities or bugs present in the first version of the first software package. To determine whether the second version of the first software package should be recommended or not, a set of operations may be performed, as described herein.

At any time-instant, the system 102 may receive an input that indicates usage of a first version of a first software package inside a source code of the software. The software may be a computer application, which may be developed or managed by the user 112. For example, the software may be developed by the user 112 through a low-code, a no-code, or a code-based application development platform. The received input may include, for example, the source code of the software or a portion of the source code which may be associated with the one or more first APIs or first functions (which may be used in the source code of the software). In some instances, the received input may include textual information. The textual information may include first data associated with a name of the first software package, second data associated with the first version of the software package, and third data associated with the second version of the software package. For example, the textual information may include "ABC" as the name of the first software package, "5.0" as the first version of the "ABC", and "5.1" as the second version of the "ABC".

Upon reception of the input, the system 102 may determine a second version or a set of versions (e.g., a second version, a third version, and the like) of the first software package. For the sake of brevity, the present disclosure describes the operations for the second version. The operations described in the present disclosure may be also applicable to any version other than the second version of the first software package.

The second version of the first software package may have a release date for use of the software, such as a public release date, that may be after an earlier usage release date, such as an earlier public release date, of the first version of the first software package. In another embodiment, the second version of the first software package may have a public release date that is before the public release date of the first version of the first software package. As used herein, a public release date is used as an example of a release date for use of the software or "release date" for short.

The system 102 may select one or more constraints from a set of constraints. The set of constraints may include a security constraint, a compatibility constraint, an interoperability constraint, and a performance constraint. In an embodiment, the one or more constraints may be rendered on the electronic device 106 and may be selected by the user 112 via the electronic UI 110 of the electronic device 106. Details about a selection of the one or more constraints from the set of constraints are provided, for example, in FIG. 3.

Based on the selection of the one or more constraints, the system 102 may execute a set of checks. The set of checks may include, for example, a security check, a compatibility check, an interoperability check, and a performance check. The security check may be associated with the security constraint of the selected one or more constraints. The compatibility check may be associated with the compatibility constraint of the selected one or more constraints. The interoperability check may be associated with the interoperability constraint of the selected one or more constraints. Similarly, the performance check may be associated with the performance constraint of the selected one or more constraints. The set of checks may be executed to determine a suitability of the second version as an update for the first version of the software package.

In an embodiment, the set of checks for the second version of the first software package may be executed in an order of priority. The order of priority may indicate a first priority associated with the security check, a second priority associated with the compatibility check, a third priority associated with the interoperability check, and a fourth priority associated with the performance check. Specifically, the security check may have the highest priority followed by the compatibility check. The interoperability check may have less priority than the security check and the compatibility check but more priority than the performance check (which may have the least priority among all the checks in the set of checks). Each check of the set of checks may include a set of operations that may have to be executed according to the order of priority. Details about execution of each of the set of checks are provided, for example, in FIG. 6, FIG. 7, FIG. 8, FIG. 9, FIG. 10, and FIG. 11.

Based on the determined suitability, the system 102 may control the electronic device 106 to render user-assistive information. In an embodiment, the user-assistive information may be displayed on the electronic UI 110 of the electronic device 106 and may include a recommendation to update the first version to the second version. In another embodiment, the user-assistive information may include a first recommendation to update the source code of the software so as to be source-code compatible with the second version of the first software package. In another embodiment, the user assistive information may include a second recommendation to upgrade to the second version of the first software package. In another embodiment, the user assistive information may include a set of reasons for recommending or not recommending the second version of the first software package as an update for the first version. Details about the user-assistive information are provided, for example, in FIG. 14.

It should be noted that the communication between the system 102, the one or more web-based sources 104, and the electronic device 106 may be performed via the communication network 108. The communication network 108 may include a communication medium through which the system 102 may communicate with the one or more web-based sources 104, the electronic device 106, and/or different devices (not shown). Examples of the communication network 108 may include, but are not limited to, the Internet, a cloud network, a cellular network (such as a 4th Generation Long-Term Evolution (LTE) or 5th generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to the system 102 without departing from the scope of the present disclosure. For example, in some embodiments, the system 102 may include any number of other components that may not be explicitly illustrated or described.

Figure 2:
FIG. 2 is a block diagram of a system for recommending version updates for software packages.
Figure 2:
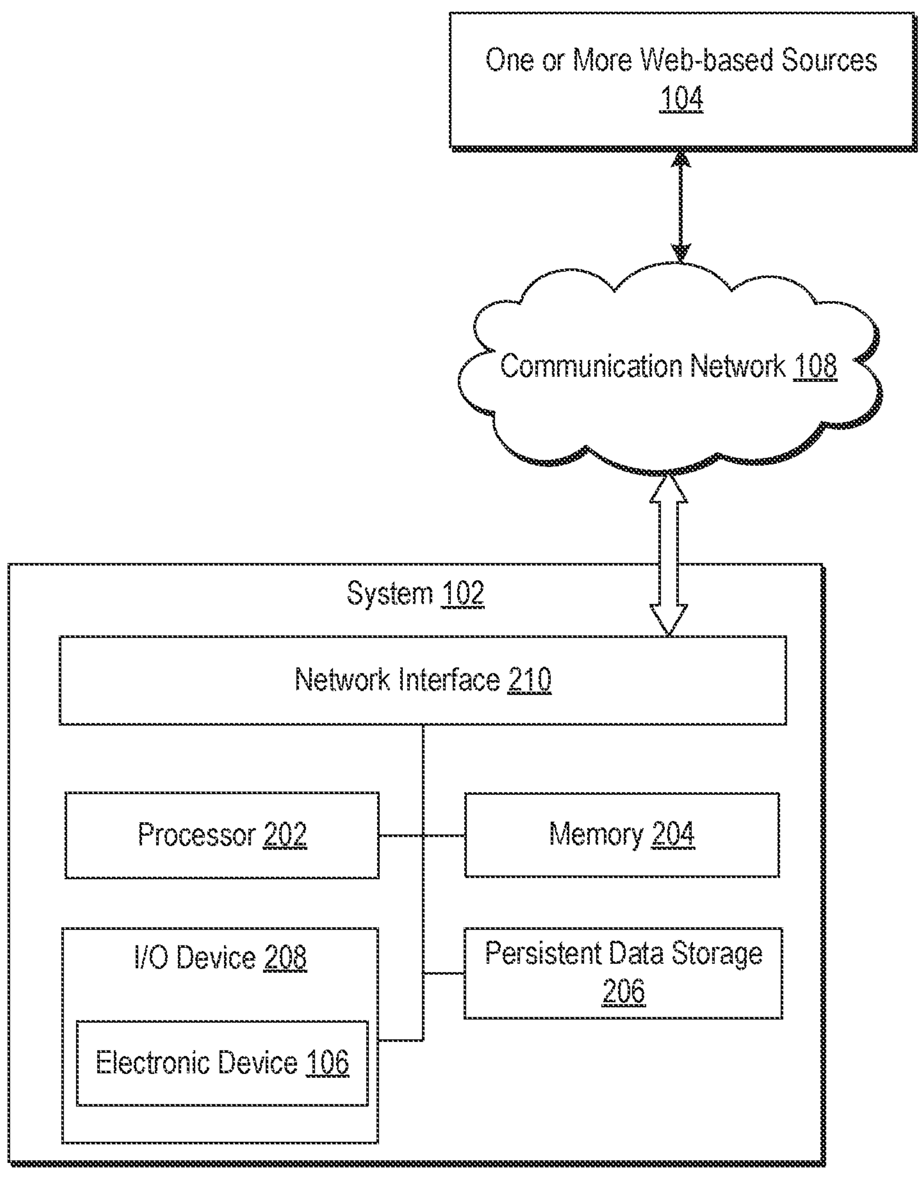

FIG. 2 is a block diagram of a system for recommending version updates for software packages, arranged in accordance with at least one embodiment described in the present disclosure. FIG. 2 is explained in conjunction with elements from FIG. 1. With reference to FIG. 2, there is shown a block diagram 200 of the system 102 of FIG. 1. The system 102 may include a processor 202, a memory 204, and a persistent data storage 206. In some embodiments, the system 102 may also include an input/output (I/O) device 208 that may include a network interface 210 and the electronic device 106. There is further shown the one or more web-based sources 104 that may be communicatively coupled to the system 102.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store the received input, and the selected one or more constraints, the set of checks, the first version of the software package and the second version of the software package. In certain embodiments, the memory 204 may be configured to store the user-assistive information, the public release date of the first version of the first software, and the public release date of the second version of the first software. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electronically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. In an embodiment, the persistent data storage 206 may be configured to store a user input, one or more vulnerability databases, a security check result, a compatibility check result, an interoperability check result, and a performance check result. In some other embodiments, the persistent data storage 206 may be configured to store a set of files, a dataset, and a machine learning (ML) model. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more inputs. The I/O device 208 may be further configured to provide an output in response to the one or more inputs. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, the electronic device 106 and a speaker.

The network interface 210 may include suitable logic, circuitry, interfaces, and/or code that may be configured to establish a communication among the system 102, the one or more web-based sources 104, and the electronic device 106 via the communication network 108. The network interface 210 may be implemented by use of various known technologies to support wired or wireless communication of the system 102, via the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

Figure 3:
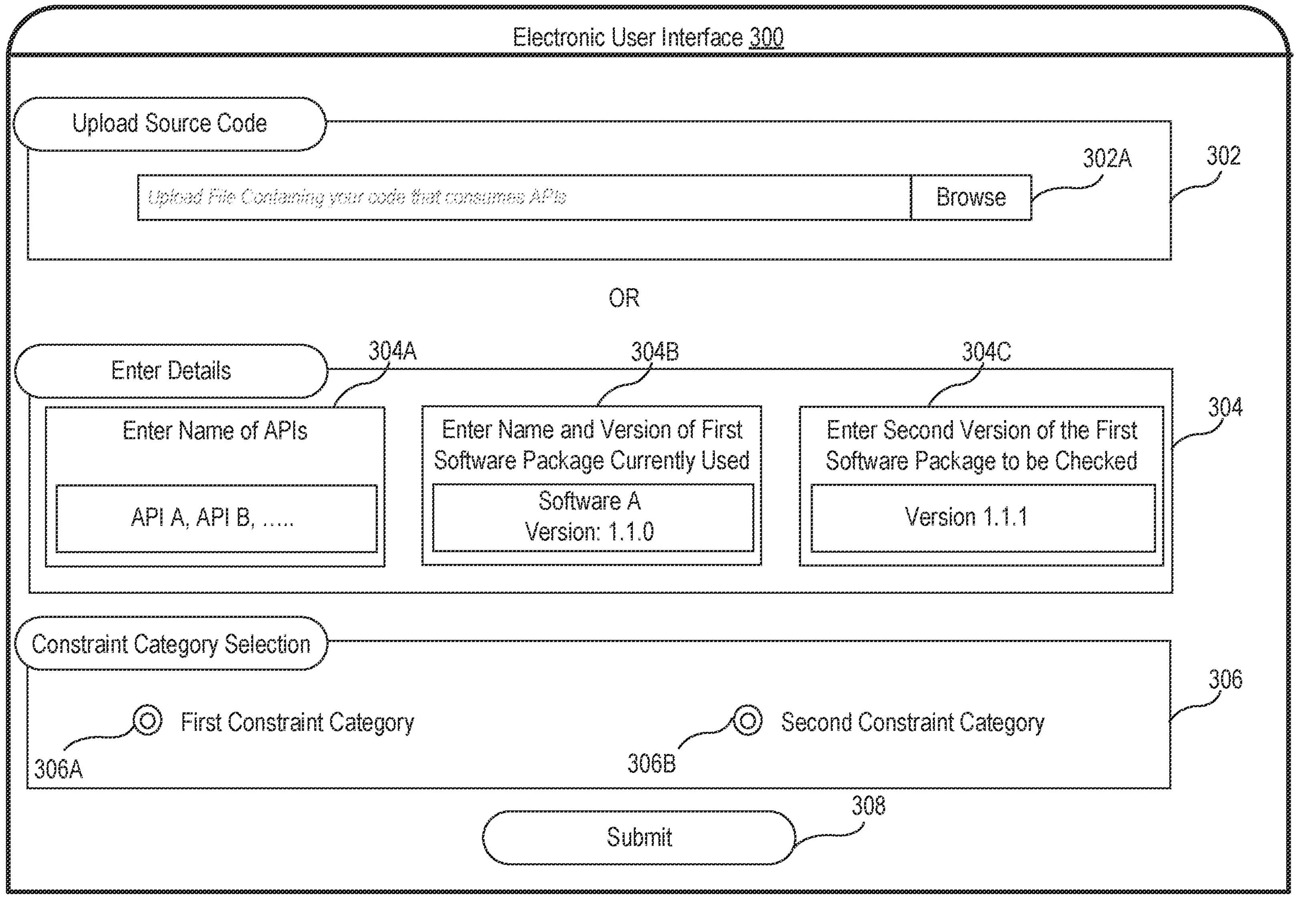
FIG. 3 illustrates an exemplary electronic user interface (UI) for providing a set of input(s) recommending version updates for software packages.

FIG. 3 illustrates an exemplary electronic user interface (UI) for providing a set of input(s) recommending version updates for software packages, according to at least one embodiment described in the present disclosure. FIG. 3 is explained in conjunction with elements from FIG. 1 and FIG. 2. With reference to FIG. 3, there is shown an electronic UI 300, which may be an example implementation of the electronic UI 110 of FIG. 1. The electronic UI 300 may be displayed on the electronic device 106 based on a user request, which may be received via an application interface displayed onto a display screen of the electronic device 106. The application interface may be part of an application software, for example, a software development kit (SDK), a cloud server-based application, a web-based application, an OS-based application/application suite, an enterprise application, or a mobile application.

As also discussed, in FIG. 1, the received input may be indicative of a usage of the first version of the first software package inside the source code of the software. In an embodiment, the received input may include at least one of the source code of the software or a portion of the source code of the software. The portion of the source code may indicate a usage of one or more first APIs, the first functions provided by the first software package, or textual information.

On the electronic UI 300, there is shown a set of UI elements, such as a first UI element 302, a second UI element 304, a third UI element 306, and a fourth UI element 308. The first UI element 302 may be labelled as, for example, "Upload Source Code". The first UI element 302 may include a browse button 302A. Through the browse button 302A, the user 112 may upload a file or a directory/repository that includes the source code of the software or the portion of the source code. In some instances, a repository that includes multiple source code files may be uploaded by the user 112 via the browse button 302A. The source code of the software may have been written in any programming language and may include information about the one or more first APIs or the first functions and the first version of the first software package which provides the one or more first APIs or the first functions.

In some instances, the user 112 may not want to upload the source code or the portion of the source code of the software. In such a scenario, the user 112 may provide the input via the second UI element 304. The second UI element 304 may be labelled as, for example, "Enter Details". The second UI element may include an API textbox 304A, a first software package information textbox 304B, and/or a second software package information textbox 304C. Through the API textbox 304A, the first software package information textbox 304B, and/or the second software package information textbox 304C, the system 102 may receive the textual information associated with the software application. The textual information may include first data associated with one or more first APIs or the first functions that may be used in the source code of the software, second data associated with a name of the first software package along with the first version of the first software package, and third data associated with the second version of the first software package.

The API textbox 304A may be a textbox where the user 112 may add information about the name of the one or more first APIs or the first functions that may be used in the source code of the software. The first software package information textbox 304B may allow the user 112 to add information about the first software package that provides the one or more first APIs or first functions to the software. Specifically, the information about the software package may include at least a name of the first software package and a current version (i.e., the first version) of the first software package. The second software package information textbox 304C may allow the user 112 to add information about an updated version (e.g., the second version) of the first software package which may have to be checked for suitability as an update for the first version. It should be noted that the second software package information textbox 304C may be optional. By default, the system 102 may select the latest or most recent version of the first software package as the second version of the first software package.

The third UI element 306 may be labelled as, for example, "Constraint Category Selection". The third UI element 306 may include a first radio button 306A associated with a first constraint category (i.e., a first option), and a second radio button 306B for the selectin of a second constraint category (i.e., a second option). The user 112 may select the first radio button 306A for selection of the first constraint category. Similarly, the user 112 may select the second radio button 306B for selection of the second constraint category.

In an embodiment, the system 102 may be configured to control the electronic device 106 to display options that categorize the set of constraints into a set of categories. The system 102 may receive a user input via the electronic device 106 and may select an option from the displayed options based on the received user input. One or more constraints may be selected based on the selected option.

In an embodiment, the selection of the first constraint category, via the first radio button 306A, may correspond to the selection of a first methodology to determine the suitability of the second version as a suitable update for the first version. Similarly, the selection of the second constraint category, via the second radio button 306B, may correspond to the selection of a second methodology to determine the suitability of the second version as a suitable update for the first version. The first methodology may include operations which may not require the source code of the software to be modified after the update to the second version of the first software package. Similarly, the second methodology may correspond to a process in which the source code of the software may have to modified after the update to the second version of the first software package. Details about the first methodology and the second methodology are provided, for example, in FIG. 4 and FIG. 5.

If the first constraint category is selected, then the system 102 may select of the security constraint, the compatibility constraint, and the interoperability constraint as hard constraints and the performance constraint as a soft constraint. A hard constraint must be satisfied at all the times whereas a soft constraint may have to be satisfied as much as possible if the cost for doing so is not too great. If the second constraint category is selected, then the system 102 may be configured to select of the security constraint as the hard constraint, and the compatibility constraint, the interoperability constraint, and the performance constraint as soft constraints. For the second constraint category, the relevance of the compatibility constraint and the interoperability constraint may be more than that of the performance constraint among the soft constraints.

The fourth UI element 308 may be labelled as, for example, "Submit" and may be a button. Upon a selection of the button, the system 102 may be configured to execute a set of checks to determine the suitability of the second version of the first software package as an update for the first version of the first software package.

It should be noted that the UI/UI elements in the electronic UI 300 are merely provided as an example and should not be construed as limiting the present disclosure. In some embodiments, the electronic UI 300 may be suitably modified to allow the user 112 to enter or upload more information associated with the software and/or first software package.

Figure 4:
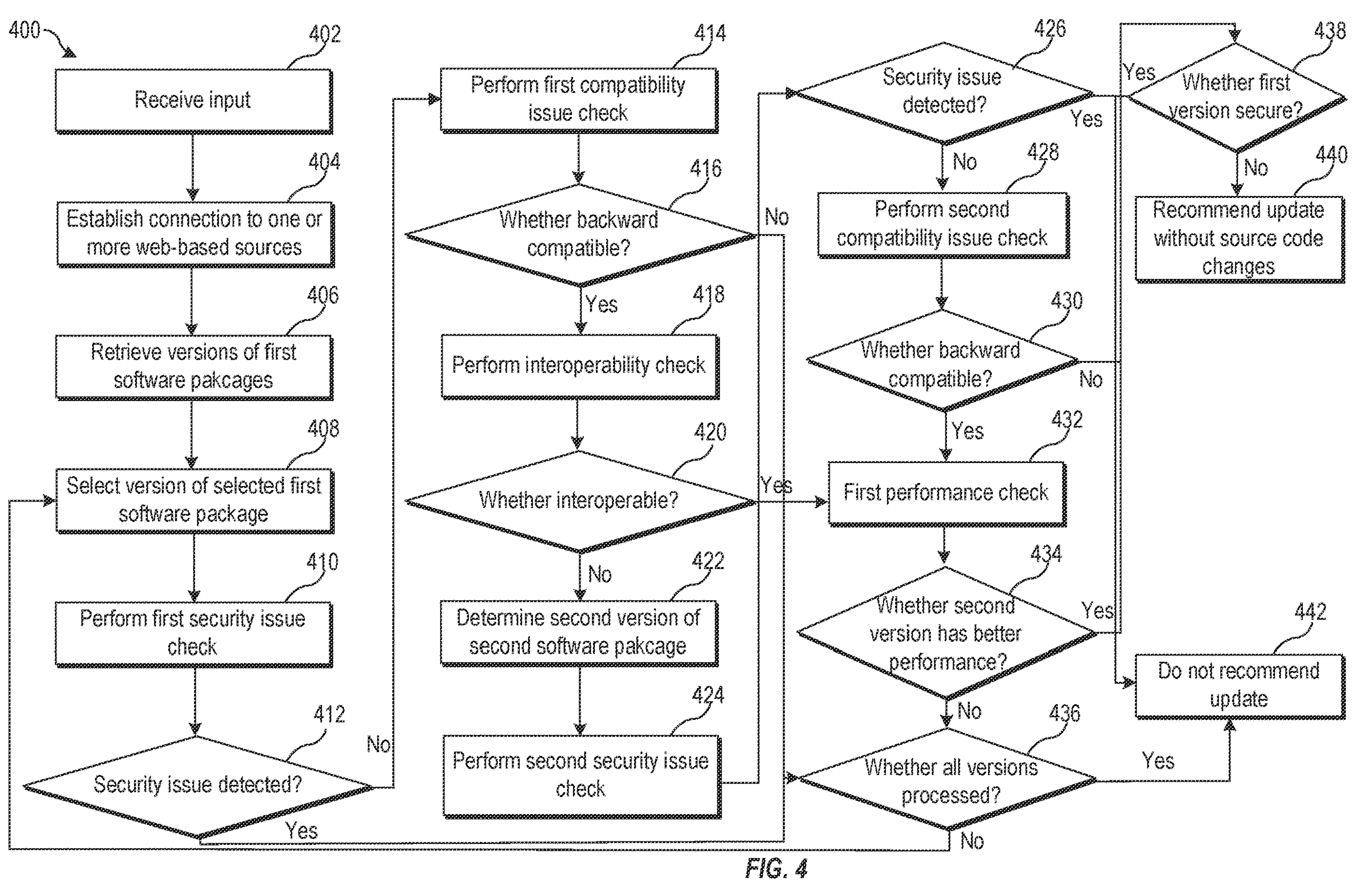
FIG. 4 illustrates a flowchart of an exemplary first method for recommending version updates for software packages.

FIG. 4 illustrates a flowchart of an exemplary first method for recommending version updates for software packages, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 (e.g., if the first radio button 306A (i.e., the first methodology) is selected by the user 112) and may be performed by any suitable system, apparatus, or device, such as by the system 102 of FIG. 1 or FIG. 2.

At 402, an input may be received. The input may be received from the electronic device 106 via the electronic UI 110 that may be displayed on the electronic device 106. The input may indicate a usage of a first version of a first software package inside a source code of a software. In an embodiment, the received input may include the source code of the software. In another embodiment, the received input may include one or more first APIs or first function names that may be used inside the source code of the software. Along with APIs or the function names, the input may also include a name of the first software package along with the first version of the first software package. In an embodiment, the received input may include one or more constraints (as described in FIG. 3). Details about the received input are provided, for example, in FIG. 3.

At 404, a connection to the one or more web-based sources 104 may be established. In an embodiment, the system 102 may establish the connection to the one or more web-based sources 104 that may include web-based software package hosting systems (e.g., GitHub®), version control systems, web-based software metadata storage services, or websites. The system 102 establish the connection between the system 102 and the one or more web-based sources 104 via the communication network 108. Details about the one or more web-based sources 104 are provided, for example, in FIG. 1.

At 406, one or more versions of first software package may be retrieved. In an embodiment, the system 102 may be configured to retrieve the one or more version of the first software package from the one or more web-based sources 104 after the connection is established. Such versions may include publicly released versions and unreleased versions of the first software package that may be available on the one or more web-based sources 104. The released versions of the first software package may be available to general public or registered users, whereas the one or more unreleased versions of the first software package may be under testing and may be made available to a particular group of people.

In an embodiment, the system 102 may transmit a first API request to the one or more web-based sources 104 to retrieve the one or more versions of the first software package. Such versions of the first software package may be stored in a data structure (e.g., a list). The list may include the name of the first software package and the corresponding one or more versions. Each of the one or more versions of the first software package may be represented through a numeric value, an alphabet, a string, or an alphanumeric string. In an embodiment, the retrieved name of the first software package along with the corresponding one or more versions of the first software package may correspond to software metadata associated with the first software package.

At 408, a version may be selected from the one or more versions of the first software package. In an embodiment, the system 102 may select a version of the one or more versions of the first software package from the list. The selection of versions from the list may be an iterative process that may be performed after a set of operations from 410 to 436 is performed for a selected version. For example, another version (i.e., a new version) of the first software package may be selected after the control is transferred back to 408 from 436. The new version may be a next entry of the list.

At 410, a first security check may be executed on the selected version of the first software package. The security check may be executed to determine one or more security issues (or vulnerabilities) in the second version of the first software package. The system 102 may execute the security check based on a selection of the security constraint (for example, as described in FIG. 3). In an embodiment, the system 102 may generate a security check result for the second version of the first software package. The generated result may indicate a presence of at least one security issue in the selected version of the first software package. Such issue(s) may or may not be present in a previous version (e.g., the first version) of the first software package. Details about the generation of the security check result are provided, for example, in FIG. 6.

At 412, it may be determined whether the security issue is present in the second version of the first software package or not. In case no security issue is detected, the control may be transferred to 414. Otherwise, the control may be transferred to 436.

At 414, a first compatibility check may be executed on the selected version of the first software package. Specifically, the system 102 may execute the first compatibility check to determine whether the second version of the first software package is backward or forward compatible with respect to the first version of the first software package or not. The second version of the first software package may be said to be backward compatible if the software (i.e., a computer program written to consume one or more APIs) that works with the first version can work the same way with the second version of the first software package. In an embodiment, the system 102 may generate a first compatibility check result that may indicate whether the second version of the first software package is backward or forward compatible with respect to the first version of the first software package. Details about the generation of the first compatibility check result are provided, for example, in FIG. 7, FIG. 8, and FIG. 9.

At 416, it may be determined whether the second version of the first software package is compatible with respect to the first version of the first software package or not. Such a determination may be performed based on the generated first compatibility check result. In case the second version is compatible with respect to the first version, the control may be transferred to 418. Otherwise, the control may be transferred to 436.

At 418, an interoperability check may be executed on the selected version of the first software package. Specifically, the system 102 may execute the interoperability issue to check to determine whether the selected version of the first software package is interoperable with a first version of a second software package used in the source code of the software. For example, if the selected version of the first software package "A" is 2.0 and the first version of a second software package "B" is "1.0", then the system 102 may be configured to determine whether the version "2.0" of the first software package "A" is interoperable with the version "1.0" of the second software package "B". In an embodiment, the software may use the first software package as well as the second software package to achieve one or more objectives of the software application. The selected version of the first software package may be said to be interoperable with the first version of the second software package if the selected version of the first software package and the first version of the second software package work seamlessly without a need to modify a source code of the software. In an embodiment, the system 102 may be configured to generate an interoperability check result that may indicate whether the second version of the first software package is interoperable with the first version of the second software package. Details about the generation of the interoperability check result are provided, for example, in FIG. 10.

At 420, it may be determined whether the selected version of the first software package is interoperable with the first version of the second software package. Such determination may be based on the generated interoperability check result. In case the second version of the first software package is interoperable with respect to the first version of the second software package, the control may be transferred to 432. Otherwise, the control may be transferred to 422.

At 422, a second version of the second software package may be determined. The second version of the second software package may be determined from the one or more web-based sources 104. In an embodiment, the system 102 may be configured to transmit a second API request to the one or more web-based sources 104 to retrieve the second version of the second software package.

At 424, a second security check may be executed on the second version of the second software package. Specifically, the system 102 may be configured to execute the second security check to determine whether one or more security issues (or vulnerabilities) are present in the second version of the second software package. In an embodiment, the system 102 may be configured to generate a second security check result for the second version of the second software package. The generated security check result may indicate a presence of at least one security issue in the second version of the second software package. Details about the generation of the second security check result are provided, for example, in FIG. 6.

At 426, it may be determined whether the security issue is detected in the second version of the second software package or not. The system 102 may be configured to detect the security issue in the second version of the second software package based on the second security check result associated with the second version of the second software package. In case no security issue is detected, the control may be transferred to 438. Otherwise, the control may be transferred to 442.

At 428, a second compatibility check may be executed on the second version of the second software package. Specifically, the system 102 may execute the second compatibility check to determine whether the second version of the second software package is compatible with respect to the first version of the second software package or not. For such determination, the system 102 may be configured to generate a second compatibility check result. The generated compatibility check result may indicate a compatibility of the second version of the second software package with the first version of the second software package. Details about the generation of the second compatibility check result are provided, for example, in FIG. 7, FIG. 8, and FIG. 9.

At 430, it may be determined whether the second version of the second software package is compatible with respect to the first version of the second software package or not. Such determination may be based on the generated second compatibility check result. In case the second version of the second software package is compatible with respect to the first version of the second software package, the control may be transferred to 432. Otherwise, the control may be transferred to 438.

At 432, a first performance check on the second version of the first software package may be executed. In an embodiment, the system 102 may be configured to execute the first performance check on the second version of the first software package. Specifically, the first performance check may be executed to determine whether the second version of the first software package has certain enhancements with respect to the first version of the first software package or the second version fixes certain issues associated with the first version of the first software package. Such enhancements may be determined with respect to one or more bugs that may be fixed in the second version of the first software package, one or more features introduced in the second version of the first software package, one or more security issues fixed in the second version of the first software package, and the like.

In an embodiment, the system 102 may generate a performance check result. The result may indicate differences in a performance of the second version of the first software package in comparison to the first version of the first software package. Details about the generation of the performance check result are provided, for example, in FIG. 11.

At 434, it may be determined whether the performance of the second version of the first software package is better that the first version of the first software package. Such a determination may be performed based on a generated performance check result. In case the second version of the first software package has a better performance in comparison to the first version of the first software package, the control may be transferred to 438. Otherwise, the control may be transferred to 436.

At 436, it may be determined whether each of the one or more versions of the first software package has been selected at 408. In case each of the one or more versions of the selected first software has been selected at 408, the control may be transferred to 442. Otherwise, the control may be transferred to 408 until each of the one or more version of the first software package has been selected at 408.

At 438, it may be determined whether first version of the first software package is secure or not. Specifically, it may be determined whether the first version of the first software package is associated with at least one security issue. Details about determination of the security issue associated with the first version of the first software package are provided, for example, in FIG. 6. In case the first version of the first software package is secure (i.e., no security issue is associated with the first software package), then the control may be transferred to 440. Otherwise, the control may be transferred to 442.

At 440, the second version of the first software package may be recommended. In an embodiment, the system 102 may control the electronic device 106 to render user-assistive information that includes a recommendation to update the first version to the second version of the first software package. Such a recommendation may be determined based on at least one of the first security check result, the first compatibility check result, the interoperability check result, the second security check result, the second compatibility check result, and the performance check result At 442, the second version of the first software package may not be recommended. In an embodiment, the system 102 may control the electronic device 106 to render user-assistive information that includes a recommendation to not update the first version to the second version of the first software package.

Control may pass to end. Although the flowchart 400 is illustrated as discrete operations, such as 402, 404, 406, 408, 410, 412, 414, 416, 418, 420, 422, 424, 426, 428, 430, 432, 434, 436, 438, 440, and 442. However, in certain embodiments, such discrete operations may be further divided into additional operations, combined into fewer operations, or eliminated, depending on the particular implementation without detracting from the essence of the disclosed embodiments.

Figure 5:
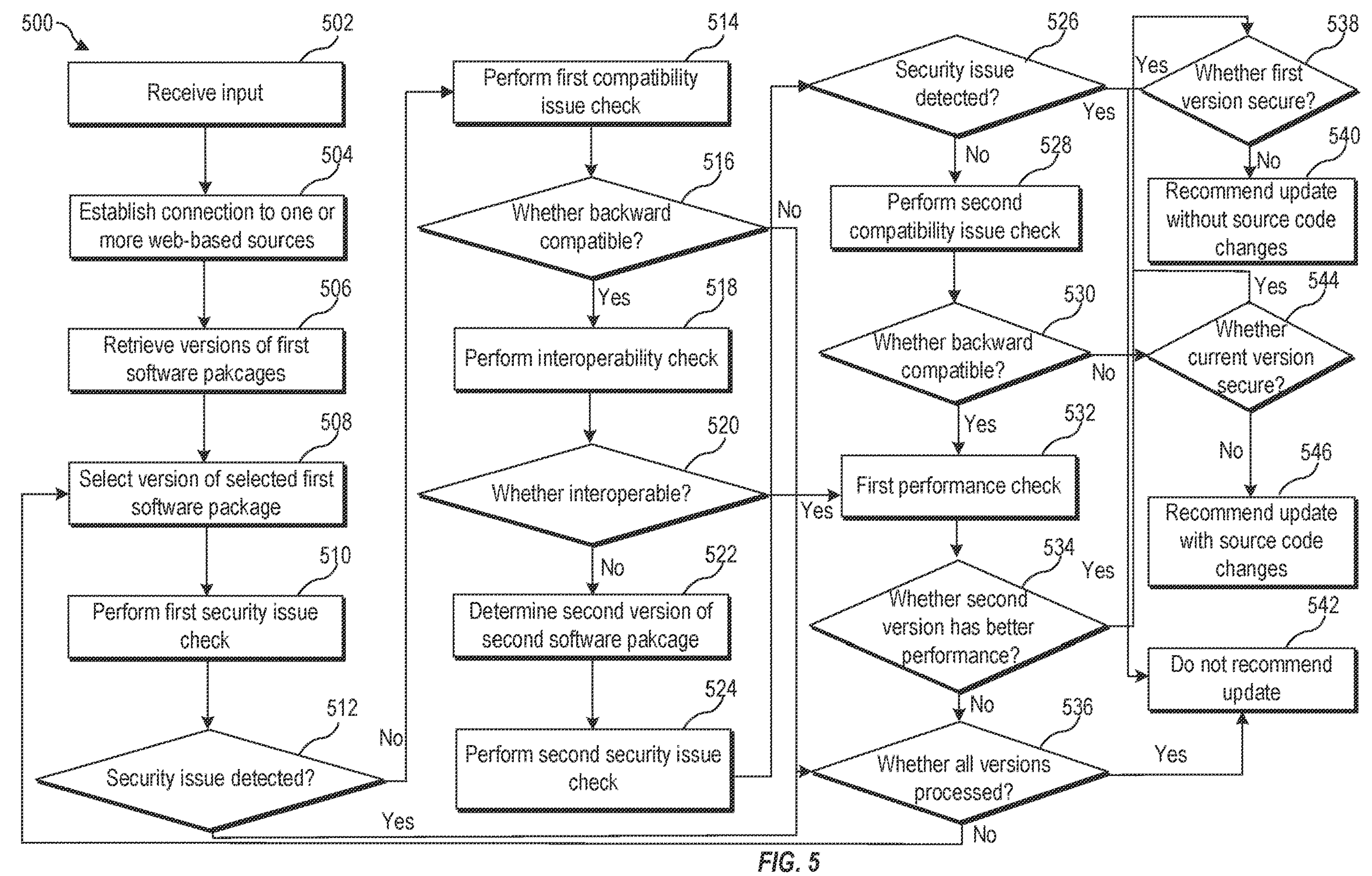
FIG. 5 illustrates a flowchart of an exemplary second method for recommending version updates for software packages.

FIG. 5 illustrates a flowchart of an exemplary second method for recommending version updates for software packages, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 if the second radio button 306B (i.e., the second methodology) is selected by the user 112 and may be performed by any suitable system, apparatus, or device, such as by the system 102 of FIG. 1 or FIG. 2.

At 502, an input may be received. The received input may be received from the electronic device 106 via the electronic UI 300 that may be displayed on the electronic device 106. The received input may indicate a usage of a first version of a first software package inside a source code of a software. More details about the reception of the input are provided in FIG. 3 and FIG. 4.

At 504, connection to the one or more web-based sources 104 may be established. Specifically, the system 102 may be configured to establish a connection to the one or more web-based sources 104 based on the received input. Details about the one or more web-based sources 104 are provided, for example, in FIG. 1 and FIG. 4.

At 506, one or more versions of first software package may be retrieved. Specifically, the system 102 may be configured to retrieve one or more versions of the first software package after the connection to the one or more web-based sources 104 is established. In an embodiment, the one or more versions may include released versions and unreleased versions of the software that may be available on the one or more web-based sources 104. In an embodiment, the retrieved one or more versions may be stored in a list. Details about the retrieval of the one or more versions are provided, for example, in FIG. 4.

At 508, a version from the retrieved one or more versions of the first software package may be selected. The version may be selected from the one or more versions associated with the first software package and stored in the list. In an embodiment, the system 102 may be configured to select another version after the control is transferred back to 508 from 536. In an embodiment, the second version of the first software package may be selected in a first iteration of the set of operations performed in the flowchart 500. The retrieved one or more versions may be selected after the second version of the first software package has been selected.

At 510, a first security check may be executed on the selected version of the first software package. Specifically, the system 102 may be configured to execute the first security check to determine one or more security issues (or vulnerabilities) in the second version of the first software package. In an embodiment, the system 102 may be configured to generate a first security check result for the second version of the first software package. The generated first security check result may indicate a presence of at least one security issue in the selected version of the first software package. Details about the generation of the first security check result are provided, for example, in FIG. 6.

At 512, it may be determined whether the security issue is detected in the second version of the first software package or not. The system 102 may be configured to detect the security issue in the second version of the first software package based on the generated first security check result associated with the second version of the first software package. In case security issue is detected, the control may be transferred to 536. Otherwise, the control may be transferred to 514.

At 514, a first compatibility check may be executed on the selected version of the first software package. Specifically, the system 102 may be configured to execute the first compatibility check to determine whether the second version of the first software package is backward compatible with respect to the first version of the first software package or not. The second version of the first software package may be said to be backward compatible if the software (a program written to consume one or more first APIs) that works with first version can work the same way with the second version of the first software package. In other words, the second version is backward compatible if the clients are able to work with the second version of the first software package seamlessly (i.e., without any modification in a source code of the software). In an embodiment, the system 102 may be configured to generate a first compatibility check result that may indicate whether the second version of the first software package is backward or forward compatible with respect to the first version of the first software package or not. Details about the generation of the first compatibility check result are provided, for example, in FIG. 7, FIG. 8, and FIG. 9.

At 516, it may be determined whether second version of the first software package is compatible with respect to the first version of the first software package or not. Such determination may be based on the generated first compatibility check result. In case, the second version is compatible with respect to the first version, the control may be transferred to 518. Otherwise, the control may be transferred to 536.

At 518, an interoperability check may be executed on the selected version of the first software package. Specifically, the system 102 may be configured to execute the interoperability check to determine whether the second version of the first software package is interoperable with a first version of a second software package used in the source code of the software. In an embodiment, the software may use the first software package as well as the second software package to achieve one or more objectives. The second version of the first software package may be said to be interoperable with the first version of the second software package if the second version of the first software package and the first version of the second software package work seamlessly (i.e., without any modification in a source code of the software). In an embodiment, the system 102 may be configured to generate an interoperability check result that may indicate whether the second version of the first software package is interoperable with the first version of the second software package. Details about the generation of the interoperability check result are provided, for example, in FIG. 10.

At 520, it may be determined whether second version of the first software package is interoperable with the first version of the second software package or not. Such determination may be based on the generated the interoperability check result. In case, the second version of the second software package is not interoperable with respect to the first version of the second software package, the control may be transferred to 522. Otherwise, the control may be transferred to 532.

At 522, a second version of the second software package may be determined. In an embodiment, the system 102 may be further configured to determine the second version of the second software package from the one or more web-based sources 104. Details about the determination of the second version are provided, for example, in FIG. 4.

At 524, a second security check may be executed on the second version of the second software package. Specifically, the system 102 may be configured to execute the second security check to determine one or more security issues (or vulnerabilities) in the second version of the second software package. In an embodiment, the system 102 may be configured to generate a second security check result for the second version of the second software package. The generated security check result may indicate a presence of at least one security issue in the second version of the second software package. Details about the generation of the second security check result are provided, for example, in FIG. 6.

At 526, it may be determined whether the security issue is detected in the second version of the second software package or not. The system 102 may be configured to detect the security issue in the second version of the second software package based on the generated second security check result associated with the second version of the second software package. In case no security issue is detected, the control may be transferred to 528. Otherwise, the control may be transferred to 542.

At 528, a second compatibility check may be executed on the second version of the second software package. Specifically, the system 102 may be configured to execute the second compatibility check to determine whether the second version of the second software package is compatible with respect to the first version of the second software package or not. For such determination, the system 102 may be configured to generate a second compatibility check result that may be associated with the compatibility of the second version of the second software package with the first version of the second software package. Details about the generation of the second compatibility check result are provided, for example, in FIG. 7, FIG. 8, and FIG. 9.

At 530, it may be determined whether the second version of the second software package is compatible with respect to the first version of the second software package or not. Such determination may be based on the generated second compatibility check result. In case, the second version of the second software package is compatible with respect to the first version of the second software package, the control may be transferred to 532. Otherwise, the control may be transferred to 544.

At 532, a first performance check on the second version of the first software package may be executed. In an embodiment, the system 102 may be configured to execute the first performance check on the second version of the first software package. Specifically, the system 102 may be configured to execute the first performance check to determine whether the second version of the first software package has enhancements with respect to the first version of the first software package or fixes issues associated with the first version of the first software package. In an embodiment, the system 102 may be configured to generate a performance check result associated with a performance of the second version of the first software package in comparison to the first version of the first software package. Details about the generation of the performance check result are provided, for example, in FIG. 11.

At 534, it may be determined whether second version of the first software package has better performance in comparison to the first version of the first software package or not. Such determination may be based on a generated performance check result. In case, the second version of the first software package has better performance in comparison to the first version of the first software package, the control may be transferred to 538. Otherwise, the control may be transferred to 536.

At 536, it may be determined whether each of the one or more versions of the first software package has been selected at 508. In case each of the one or more versions of the selected first software has been selected at 508, the control may be transferred to 538. Otherwise, the control may be transferred to 508 until each of the one or more version of the first software package has been selected at 508.

At 538, it may be determined whether first version of the first software package is secure or not. Specifically, the system 102 may be configured to determine whether first version of the first software package is associated with at least one security issue. Details about determination of the security issue associated with the first version of the first software package are provided, for example, in FIG. 6. In case the first version of the first software package is secure (i.e., no security issue is associated with the first software package), then the control may be transferred to 542. Otherwise, the control may be transferred to 540.

At 540, the second version of the first software package may be recommended. In an embodiment, the system 102 may be configured to control the electronic device 106 to render user-assistive information that includes the recommendation to update the first version to the second version of the first software package. It may be also rendered that the first software package may be updated to the second version without any change in the source code of the software.

At 542, the second version of the first software package may not be recommended. In an embodiment, the system 102 may be configured to control the electronic device 106 to render user-assistive information that includes the recommendation to not update the first version to the second version of the first software package.

At 544, it may be determined whether second version of the second software package is secure or not. Specifically, the system 102 may be configured to determine whether second version of the second software package is associated with at least one security issue. Details about determination of the security issue associated with the second version of the second software package are provided, for example, in FIG. 6. In case the second version of the second software package is not secure (i.e., if at least security issue is associated with the second software package), then the control may be transferred to 546. Otherwise, the control may be transferred to 538.

At 546, the second version of the second software package and the second version of the first software package may be recommended. In an embodiment, the system 102 may be configured to control the electronic device 106 to render user-assistive information that includes the recommendation to update the first version to the second version of the first software package and to update the first version of the second software package to the second version of the second software package. In an embodiment, it may be also rendered that the first software package may be updated to the second version with one or more changes in the source code of the software. In another embodiment, it may be also rendered that the second software package may be updated to the second version because the first version of the second software package may not be interoperable with the second version of the first software package.

Control may pass to end. Although the flowchart 500 is illustrated as discrete operations, such as 502, 504, 506, 508, 510, 512, 514, 516, 518, 520, 522, 524, 526, 528, 530, 532, 534, 536, 538, 540, 542, 544, and 546. However, in certain embodiments, such discrete operations may be further divided into additional operations, combined into fewer operations, or eliminated, depending on the particular implementation without detracting from the essence of the disclosed embodiments.

Figure 6:
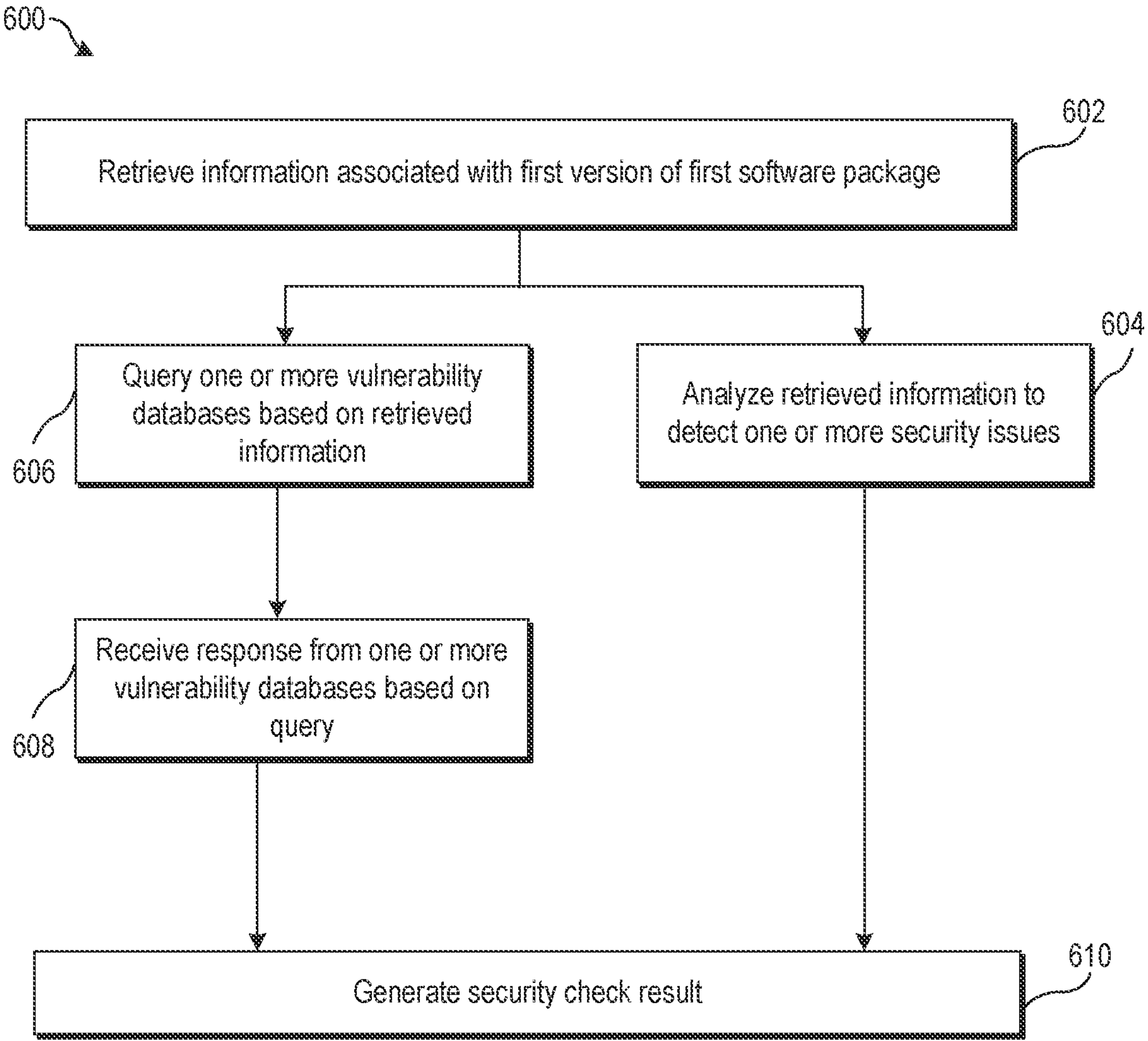
FIG. 6 illustrates a flowchart of an exemplary method for generation of security check result for recommending version updates for software packages.

FIG. 6 illustrates a flowchart of an exemplary method for generation of a security check result for recommending version updates for software packages, according to at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the system 102 of FIG. 1 or FIG. 2.

At 602, information associated with a first version of a first software package may be retrieved. Such information may be retrieved from the one or more web-based sources 104. The retrieved information may include, for example, release notes associated with the first version of the corresponding software package or one or more pull request messages associated with the first version of the first software package. A release note may refer to a technical documentation produced and distributed alongside the launch of a new software package or a new version of the software package. A pull request message may be a textual message and may include recent changes, feature enhancements, bugs, and the like associated with a version of the software package.

At 604, the retrieved information may be analyzed. In an embodiment, the system 102 may analyze the retrieved information to detect one or more security issues associated with the first version of the first software package. In an embodiment, the system 102 may search keywords associated with security issues (e.g., "security issue", "issue", "vulnerability", "flaw", and the like) in the retrieved information. If a match of the keywords is found in the retrieved information, the system 102 may analyze one or more sentences associated with the keywords to detect the one or more security issues. This may also be achieved by training a machine learning-based binary classifier by using annotated sentences which are labeled as "security related" or "not security related". After such a binary classifier is fitted, it can be used to predict if a sentence is related to security or not.

At 606, one or more vulnerability databases may be queried. In an embodiment, the system 102 may query one or more vulnerability databases. Such databases may include one or more security issues associated with each version of each software package of a collection of the software packages (hosted on the one or more web-based sources 104). Example of such databases may include, but is not limited to, Mitre® Common Vulnerabilities and Exposures (CVE), and National Vulnerability Database (NVD).

In an embodiment, the system 102 may be configured to transmit an API request to the one or more vulnerability databases to query the one or more vulnerability databases. The transmitted API request may include a name of the software package along with a version for which the security issues is to be determined. For example, at 410, the API request may include the second version of the first software package. Similarly, at 424, the API request may include the second version of the second software package.

At 608, a response may be received based on the query. In an embodiment, the system 102 may receive a response from the one or more vulnerability databases for the transmitted API request. Specifically, the received response may correspond to an API response that may be received in response to the transmitted API request. The response may include information about whether one or more security issues are associated with the second version of the first software packages (included in the API request). As an example, the received response from the one or more vulnerability databases is shown below as:

```
"configurations": {
  "CVE_data_version": "4.0",
  "nodes": {
    {
      operator": "OR",
      "cpe_match": [
        {
                  "vulnerable":true,
                  "cpe23Uri":cpe:2.3:a:abc,
                  "versionEndExcluding": "1.15.4"
        },
        {
                  "vulnerable": true,
                  "cpe23Uri":cpe:2.3:a:abc,
                  "versionStartIncluding":"2.0.0",
                  "versionEndExcluding":"2.0.3"
        },
        {
                  "vulnerable":true,
                  "cpe23Uri":"cpe:2.3:a:abc,
                  versionStartIncluding":"2.1.0",
                  "versionEndExcluding": "2.1.2"
        }
      }
    }
```

As depicted in the response, the versions which occurs before the version "1.15.4", between "2.0.0" to "2.0.3", and between "2.1.0" to "2.1.2" of the "abc" software package may have security issues (or may be vulnerable).

At 610, a security check result may be generated. In an embodiment, the system 102 may be configured to generate the security check result. The security check result may indicate whether the second version of the first software package has one or more security issues associated with it or not. In an embodiment, the generated security check result may specify a "yes" or a "no". In case the generated security check is a "yes", then the second version may be determined to have at least one security issue. In case the generated security check is a "no", then the second version may be determined to have no security issues associated with it. Examples of vulnerabilities (or security issues) may include, but are not limited to, a broken access control vulnerability, a cryptographic failure vulnerability, an injection vulnerability, an insecure design vulnerability, a security misconfiguration vulnerability, a Software and Data Integrity vulnerability, and a Server-Side Request Forgery vulnerability.

In an embodiment, the security check result may be generated based on an analysis of the one or more sentences, which may be associated with the keywords in the retrieved information. In another embodiment, the security check result may be generated based on the received response.

In an embodiment, the system 102 may determine a suitability of the of the second version based on the generated security check result. The suitability of the second version may be determined to identify whether the second version is suitable as an update for the first version. The determination of the suitability may be performed based on the generated security check result.

In an embodiment, if the generated security check result is a "yes" or the result indicates that the second version of the first software package has at least one security issue, then the system 102 may the electronic device 106 to render user-assistive information. The information may include a set of reasons for not recommending the second version of the first software package as a suitable update to the first version. Otherwise, the system 102 may control the electronic device 106 to render the user-assistive information that includes a recommendation to update the first version to the second version.

It should be noted that the flowchart 600 may correspond to security check of the set of checks that may be executed. The security check may be associated with the security constraint of the set of constraints.

Control may pass to end. Although the flowchart 600 is illustrated as discrete operations, such as 602, 604, 606, 608, and 610. However, in certain embodiments, such discrete operations may be further divided into additional operations, combined into fewer operations, or eliminated, depending on the particular implementation without detracting from the essence of the disclosed embodiments.

Figure 7:
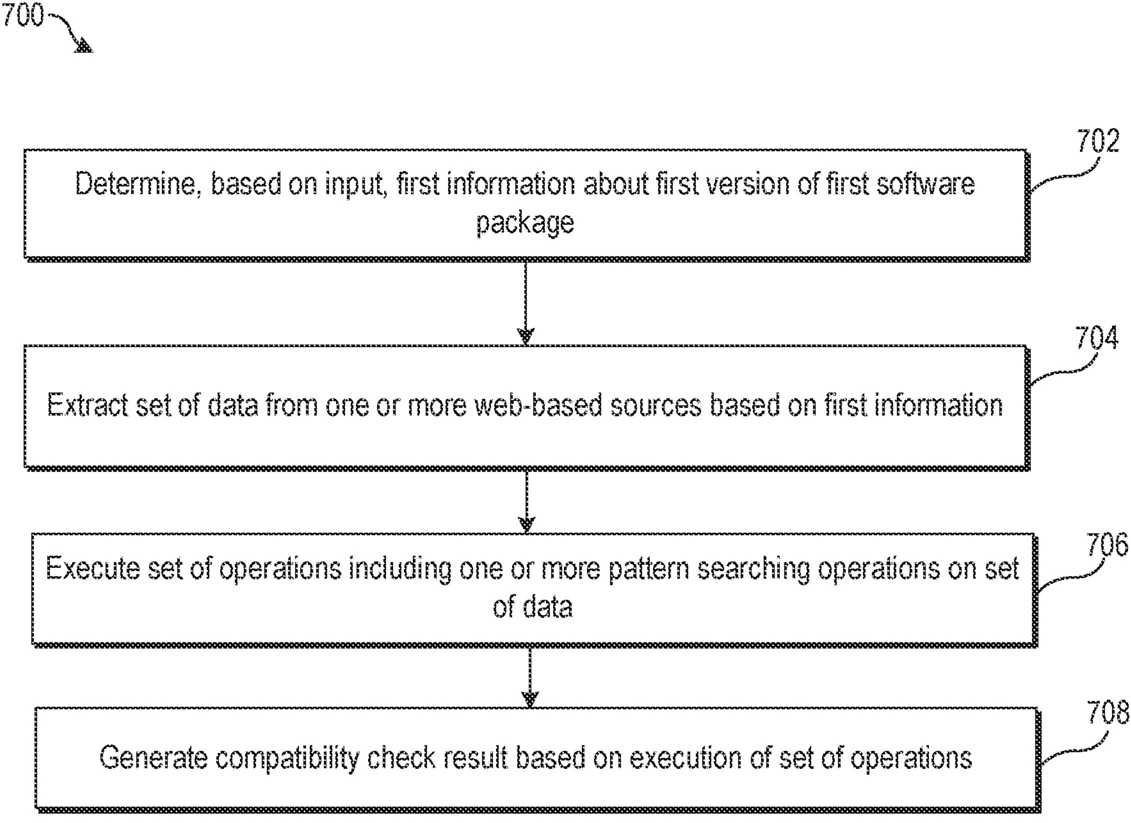
FIG. 7 illustrates a flowchart of an exemplary method for generation of compatibility check result for recommending version updates for software packages.

FIG. 7 illustrates a flowchart of an exemplary method for generation of compatibility check results for recommending version updates for software packages, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the system 102 of FIG. 1 or FIG. 2.

At 702, first information about the first version of the first software package may be determined. In an embodiment, the system 102 may determine the first information about the first version of the first software package from the one or more web-based sources 104. The first information may be about one or more first APIs or first functions that may be used in the source code of the software (i.e., developer/user application) and the first version of the first software package that may provide the one or more first APIs or the first functions.

At 704, a set of data may be extracted. In an embodiment, the system 102 may extract the set of data from the one or more web-based sources 104. The set of data may be extracted based on the determined first information and may include one or more changes in a source code of the second version of the first software package. The set of data may also include second information about the one or more changes in the second version of the first software package.

In an embodiment, the extracted set of data may include one or more changes in the source code of the second version of the first software package, with respect to source code of the first version of the first software package. Specifically, the extracted set of data may include a first file that may include the source code of the second version of the first software package, a second file that includes the second information about the one or more changes in the source code of the second version, a third file that includes a description of the first software package, and a set of first messages associated with one or more changes introduced in the source code of the second version of the first software package. As an example, the second file may correspond to a changelog that may include a curated, chronologically ordered list of notable changes for each version of the first software package. The third file may correspond to a readme file associated with the first software package (or the second version of the first software package). By way of example, and not limitation, content in the third file may include answers to following questions:

1. What is the first software package used for 48
2. Why is the first software package useful?
3. How to get started with using source code of the first software package?
4. What are some links or resources to help users with implementing the source code of the first software package?
5. Who maintains and contributes to the first software package?
6. What are the one or more changes that are performed in the second version of the first software package? (optional).
7. What APIs/methods are changed (e.g. required parameters) in the second version of the first software package?
8. What new APIs/methods are introduced second version of the first software package?
9. What APIs/methods are deprecated in the second version of the first software package?

The set of first messages may correspond to pull request messages and/or commit messages associates with the second version of the first software package.

At 706, a set of operations may be executed. In an embodiment, the system 102 may be configured to execute a set of operations that may include one or more pattern searching operations on the set of data. In an embodiment, the execution of the set of operations may include a first pattern searching operation and a second pattern searching operation. Each of the first pattern searching operation and the second pattern searching operation may be executed on the extracted set of data. Details about the execution of the first pattern searching operation are provided, for example, in FIG. 8 and details about the execution of the second pattern searching operation are provided, for example, in FIG. 9.

At 708, a compatibility check result may be generated. In an embodiment, the system 102 may be configured to generate the compatibility check result based on the execution of the set of operations. The generated compatibility check result may indicate whether the second version of the first software package is compatible with respect to the first version of the first software package. Specifically, the generated compatibility check result may indicate whether the one or more first APIs or the first functions used in the source code of the software are compatible with respect to the second version of the first software package. The system 102 may be further configured to determine the suitability of the second version as an update for the first version of the first software package, based on the generated compatibility check result.

In an embodiment, the compatibility result may correspond to a backward compatibility result or a forward compatibility result. In case a public release date of the second version of the first software package is after a public release date of the first version of the first software package, then the generated compatibility result may correspond to a backward compatibility result. In another case, if the public release date of the second version of the first software package is before the public release date of the first version of the first software package, then the generated compatibility result may correspond to a forward compatibility result.

In an embodiment, the generated compatibility check result may be either a "yes" or a "no". In case the generated compatibility check is a "yes", then it may be determined that the second version of the first software package is compatible with the first version of the first software package. In case the generated compatibility check is a "no", then it may be deemed that the second version of the first software package is incompatible with the first version of the first software package.

In an embodiment, the system 102 may determine the suitability of the of the second version based on the generated compatibility check result. If the generated compatibility check result indicates a "yes" or indicates that the second version of the first software package is compatible with the first version of the first software package, then the system 102 may control the electronic device 106 to render user-assistive information that includes a recommendation to update the first version to the second version. Otherwise, the user-assistive information may include a recommendation to not update the first version to the second version and a set of reasons for not recommending the second version as an update for the first version.

It should be noted that the flowchart 700 may correspond to the compatibility check of the set of checks that may be executed. The compatibility check may be associated with the compatibility constraint of the set of constraints.

Control may pass to end. Although the flowchart 700 is illustrated as discrete operations, such as 702, 704, 706, and 708. However, in certain embodiments, such discrete operations may be further divided into additional operations, combined into fewer operations, or eliminated, depending on the particular implementation without detracting from the essence of the disclosed embodiments.

Figure 8:
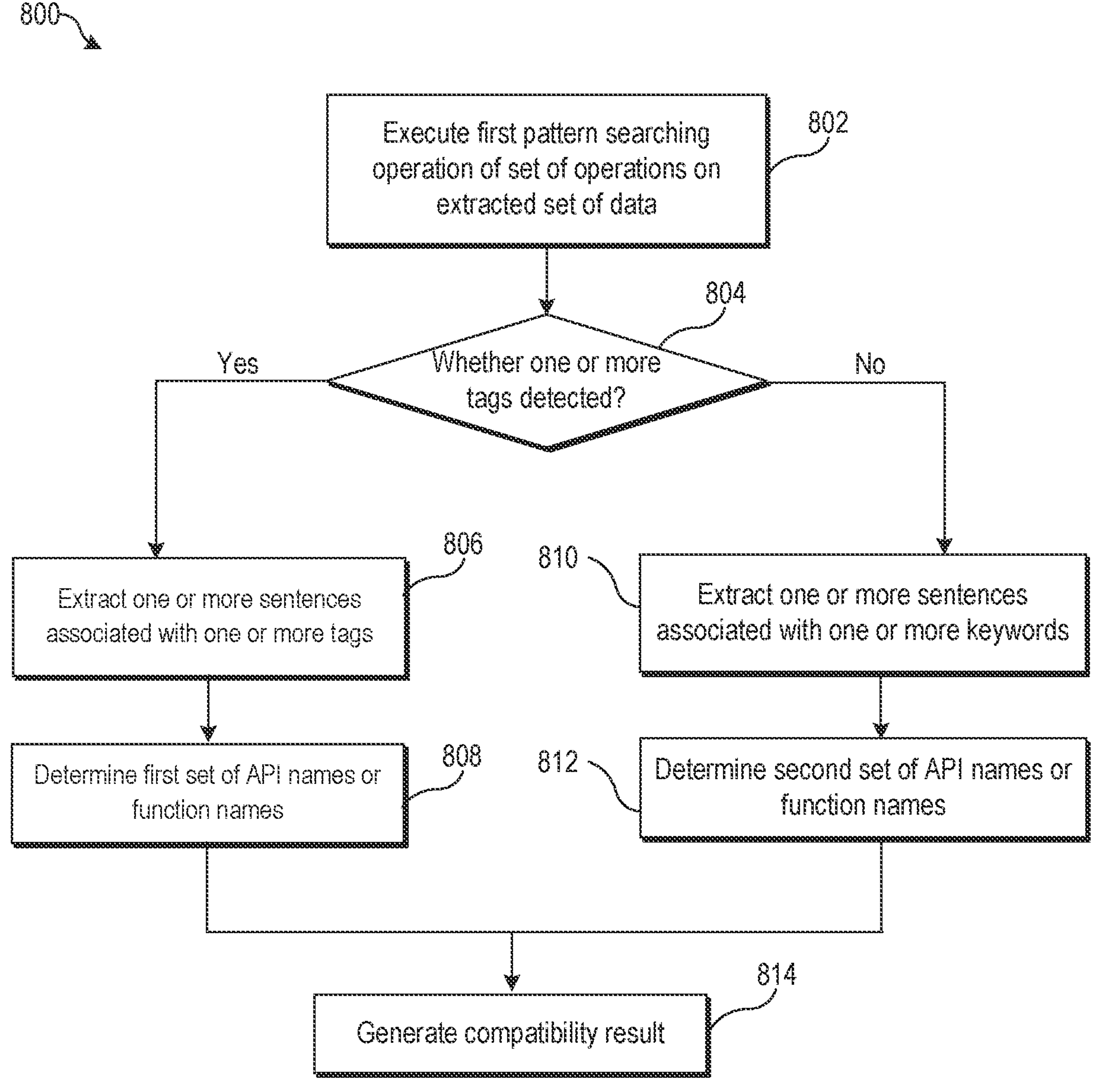
FIG. 8 illustrates a flowchart of an exemplary method for execution of a first pattern searching operation for generation of compatibility check result of FIG. 7.

FIG. 8 illustrates a flowchart of an exemplary method for execution of a first pattern searching operation for generation of compatibility check result of FIG. 7, according to at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the system 102 of FIG. 1 or FIG. 2.

At 802, the system 102 may execute a first pattern searching operation of the set of operations on the extracted set of data (for example, extracted at 704 of FIG. 7). Specifically, the system 102 may be configured to execute the first pattern searching operation on the content of the second file (i.e., a changelog present in the extracted set of data) to detect one or more tags that may be associated with the compatibility. In an embodiment, the first pattern searching operation may be a string searching operation that may use one or more regular expressions (i.e., regex) to detect the one or more tags associated with the compatibility. By way of example, and not limitation, such tags may include words such as, "breaking", "break", "incompatible", or "breaking change".

At 804, it may be determined whether the one or more tags are present in the content of the second file. In case the one or more tags are detected in the content of the second file, the control may be transferred to 806. Otherwise, the control may be transferred to 810.

At 806, one or more sentences may be extracted. In an embodiment, the system 102 may extract one or more sentences associated with the detected one or more tags. Such sentences may include the detected one or more tags.

At 808, the system 102 may determine a first set of API names or function names that may be mentioned in the extracted one or more sentences. Specifically, the first set of API names or the function names may be mentioned in the extracted one or more sentences along with the detected one or more tags.

At 810, the system 102 may extract one or more sentences associated with one or more keywords from the content of the second file. Such keywords may be semantically similar to the one or more tags. By way of example, and not limitation, one or more keywords may be "compatible", "breaking", "break", "incompatible", "breaking change", and the like. The system 102 may execute a pattern searching operation to detect such keywords in contents of the second file. The detected one or more sentences may include the detected one or more keywords.

At 812, the system 102 may determine a second set of API names or function names mentioned in the extracted one or more sentences. Each of the one or more sentences may include the one or more keywords and at least one API name of the second set of API names.

At 814, the compatibility check result may be generated. To generate the compatibility check result, the system 102 may determine whether the determined first set of API names or the function names and/or the determined second set of API names or the function names include names of the one or more first APIs, or the first functions used in the source code of the software. The compatibility result may be generated based on the determination that the determined first set of API names or the function names and/or the determined second set of API names or the function names include the names of the one or more first APIs, or the functions used in the source code of the software. As an example, if the determined tags and the keywords (e.g. incompatible, breaking, and the like) indicate a breaking compatibility and the determined API names or the function names include names of one or more APIs or functions used in the source code of the software, then the compatibility result may indicate an incompatibility of the one or more first APIs (or the first functions used in the source code of the software) with respect to the second version of the first software package. If the determined tags and the keywords (e.g. compatible, consistent, and the like) indicate that the compatibility still holds and the determined API names or the function names include names of the one or more APIs or the functions used in the source code of the software application, then the compatibility result may indicate that the one or more APIs or the functions used in the source code of the software are compatible with that of the second version of the first software package.

Control may pass to end. Although the flowchart 800 is illustrated as discrete operations, such as 802, 804, 806, 808, 810, 812, and 814. However, in certain embodiments, such discrete operations may be further divided into additional operations, combined into fewer operations, or eliminated, depending on the particular implementation without detracting from the essence of the disclosed embodiments.

Figure 9:
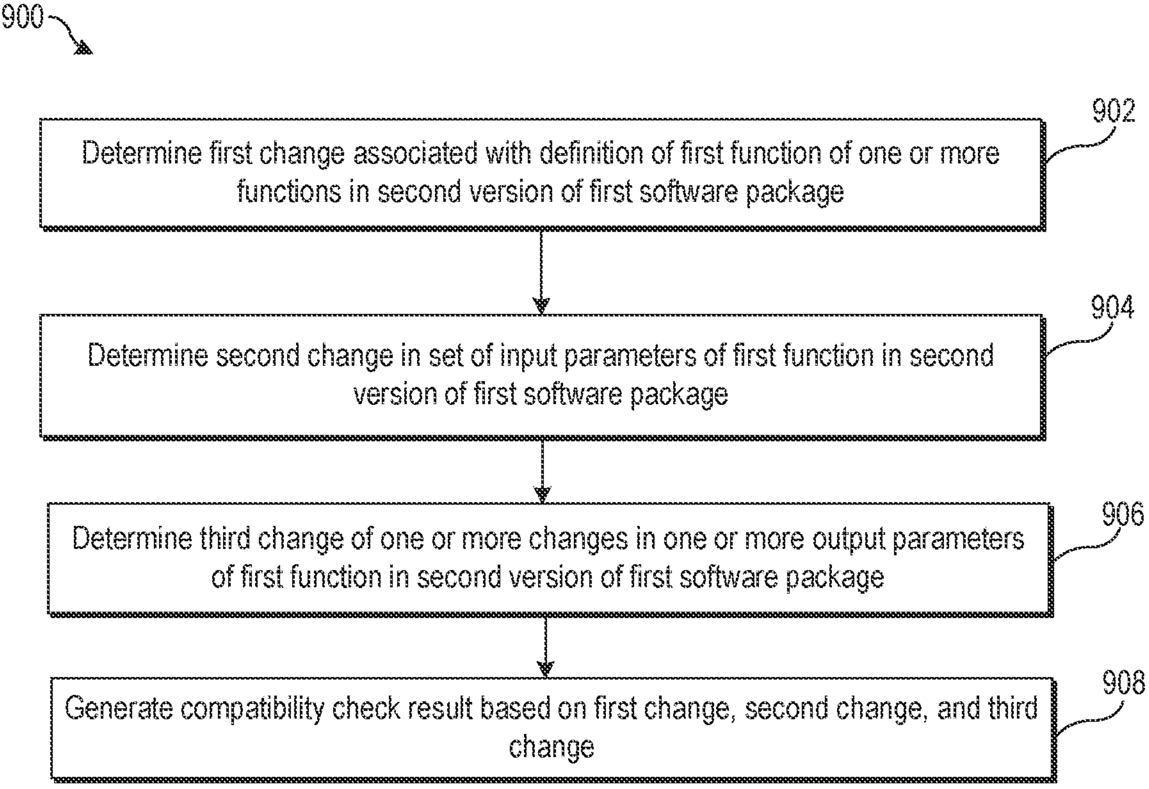
FIG. 9 illustrates a flowchart of an exemplary method for execution of a second pattern searching operation for generation of compatibility check result of FIG. 7.

FIG. 9 illustrates a flowchart of an exemplary method for execution of a second pattern searching operation for generation of compatibility check result of FIG. 7, according to at least one embodiment described in the present disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as by the system 102 of FIG. 1 or FIG. 2.

The system 102 may collect one or more code chunks, which correspond to one or more changes in a source code of a second version of a first software package with respect to a source code of a first version of the first software package. The one or more code chunks may be collected from the set of data (extracted at 704 of FIG. 7). Thereafter, the system 102 may execute a second pattern searching operation of a set of operations on the one or more code chunks to generate the compatibility check result. The second pattern searching operation may be executed to determine a set of changes, as described herein.

At 902, the system 102 may determine a first change associated with a definition of a function in the second version of the first software package. The first change may be determined with respect to the first version of the first software package.

The source code of the software may include an API call code, which when executed, sends an API call to a server that executes the function based on parameters in the API call. The first change in the definition may break compatibility if the source code of the software uses a definition from the first version of the first software package. In an embodiment, the first change may be determined if the function has been removed or re-named in the second version. In another embodiment, the first change may be determined if the visibility (such as an access modifier) of the function has changed. In another embodiment, the first change may be determined if high risk modifiers of the function have changed in the second version with respect to the first version of the first software package. Such high-risk modifiers may correspond to special keywords (such as final, default, static, this, or super) that may be associated with the function. In another embodiment, the first change may be determined if there is a change in the inheritance of a class associated with the function.

At 904, the system 102 may be configured to determine a second change in a set of input parameters of the function. The second change may be determined in the second version of the first software package, with respect to the first version of the first software package. In an embodiment, the second change may be determined based on a change in a count, a data type, a default value, a name, or an order of the set of input parameters of the function. If the source code of the software uses the set of inputs parameters from the first version of the first software package, then the second change in the set of input parameters may break compatibility.

At 906, the system 102 may determine a third change in one or more output parameters of the function. The third change may be determined in the second version of the first software package, with respect to the first version of the first software package. In an embodiment, the third change may be determined based on a change in a count, a data type, a default value, a name, or an order of the set of output parameters of the function. If the source code of the software uses the set of output parameters from the first version of the first software package, then the third change in the set of output parameters may break backward compatibility.

At 908, the system 102 may generate a compatibility check result. The compatibility check result may be generated based on the first change, the second change, and the third change. In case either of the first change, the second change, or and the third change is detected, then the generated compatibility result may indicate an incompatibility of the first version (provides one or more APIs or the functions for use in the source code of the software) with respect to the second version of the first software package. If no change is detected, then the compatibility result may indicate that the second version of the first software package is compatible with the first version of the first software package.

Control may pass to end. Although the flowchart 900 is illustrated as discrete operations, such as 902, 904, 906, and 908. However, in certain embodiments, such discrete operations may be further divided into additional operations, combined into fewer operations, or eliminated, depending on the particular implementation without detracting from the essence of the disclosed embodiments.

Figure 10:
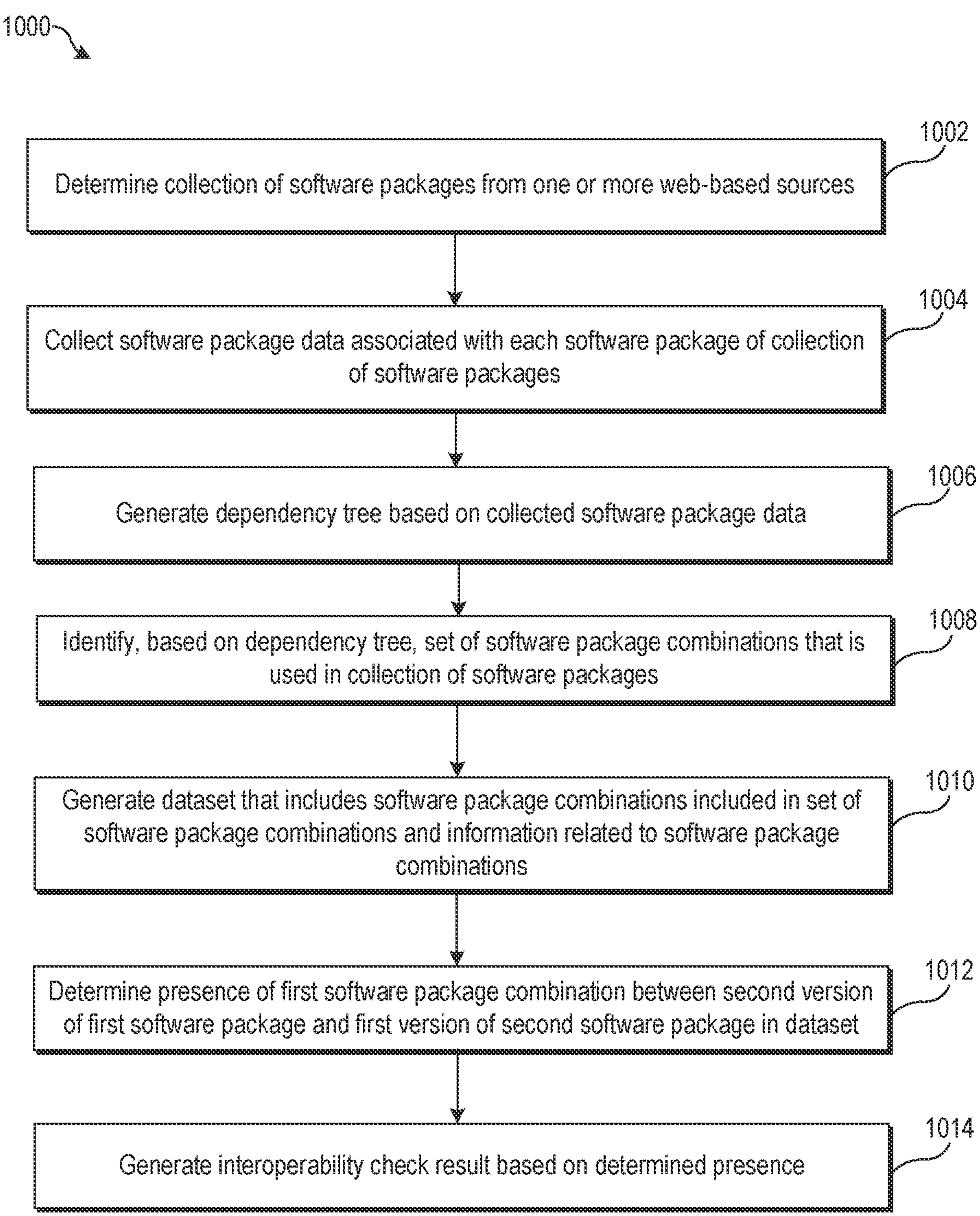
FIG. 10 illustrates a flowchart of an exemplary method for generation of interoperability check result for recommending version updates for software packages.

FIG. 10 illustrates a flowchart of an exemplary method for generation of interoperability check result for recommending version updates for software packages, according to at least one embodiment described in the present disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as by the system 102 of FIG. 1 or FIG. 2.

At 1002, a collection of software packages may be determined from the one or more web-based sources 104. In an embodiment, the collection of software packages may include the first software package and the second software package. Details about the collection of software packages are provided in FIG. 1 and FIG. 4.

At 1004, software package data associated with each software package of the collection of software packages may be collected form the one or more web-based sources 104. The software package data may include, for example, a set of dependencies and one or more package managers for software packages that may be listed in the set of dependencies. Each dependency of the set of dependencies may correspond to a source-code that the corresponding software package may utilize in order to achieve one or more tasks. In an embodiment, the set of dependencies and the one or more package managers for the software packages may be included in one or more files, such as but not limited to, "txt", "xml", and "yml".

At 1006, a dependency tree may be generated. In an embodiment, the system 102 may generate the dependency tree based on collected software package data associated with the second software package. In an embodiment, the system 102 may generate the dependency tree based on software packages (e.g., a second software package) and corresponding versions of the software packages (e.g., the second software package) included in the software package data. The dependency tree may be a directed graph and may represent one or more dependencies of the second software package towards the retrieved software packages and corresponding versions of the software packages.

At 1008, a set of software package combinations may be identified. In an embodiment, the system 102 may identify the set of software package combinations based on the generated dependency tree. Such combinations may include single-platform package combinations and respective single-platform version combinations. The single-platform package combinations may include software packages that may be associated with a single package manager and a programming language (e.g., Python). As an example, if the single-platform software package combinations include a first software package combination of a first software package (e.g., OSS A) and a second software package (e.g., OSS B), then the respective single-platform version combinations may include a first version (e.g., version 1.0) of the first software package that may work with a second version (e.g., version 1.1) of the second software package. With reference to the above example, the set of software package combinations may include OSS A+OSS B as a single-platform software package combination, and OSS A 1.0+OSS B 1.1 as a single-platform version combination.

In an embodiment, the set of software package combinations may include cross-platform software package combinations and respective cross-platform version combinations. The cross-platform software package combinations may include software packages associated with multiple package managers. As an example, if the cross-platform software package combinations include a second software package combination of a third software package (e.g., OSS C) and a fourth software package (e.g., OSS D), then the respective cross-platform version combinations may include a first version (e.g., version 1.9) of the first software package that may work with a second version (e.g., version 2.1) of the second software package. With reference to the above example, the set of software package combinations may include OSS C+OSS D as a cross-platform software package combination, and OSS C 1.9+OSS D 2.1 as a cross-platform version combination.

At 1010, a dataset may be generated. The generated dataset includes software package combinations included in the set of software package combinations and information related to the software package combinations. The information related to the software package combinations may include one or more of a name of a package manager associated with each of the software package combinations, a count of occurrence of each of the software package combinations in the set of software package combinations, names of code repositories which use the software package combinations, and a count of version combinations associated with the software package combinations.

At 1012, a presence of a software package combination in the generated dataset may be determined. In an embodiment, the system 102 may determine a presence of a software package combination in the generated dataset. The software package combination may include the second version of the first software package and the first version of the second software package. For example, if the name of the first software package is "A", the second version of the first software package is "1.0", the name of the second software package is "B", and the first version of the second software package is "2.0", then the system 102 may be configured to determine the presence of "A 1.0+B 2.0" package combination in the generated dataset.

At 1014, an interoperability check result may be generated. In an embodiment, the system 102 may generate the interoperability result based on whether the software package combination is present in the generated dataset. In case the first software package combination is present, then the second version of the first software package may be determined to be interoperable with the first version of the second software package. Otherwise, the second version of the first software package may not be considered as interoperable with the first version of the second software package.

It should be noted that the flowchart 1000 may correspond to the interoperability check of the set of checks that may be executed. The compatibility check may be associated with the compatibility constraint of the set of constraints.

Control may pass to end. Although the flowchart 1000 is illustrated as discrete operations, such as 1002, 1004, 1006, 1008, 1010, 1012 and 1014. However, in certain embodiments, such discrete operations may be further divided into additional operations, combined into fewer operations, or eliminated, depending on the particular implementation without detracting from the essence of the disclosed embodiments.

Figure 11:
FIG. 11 illustrates a flowchart of an exemplary method for generation of performance check result for recommending version updates for software packages.
Figure 11:
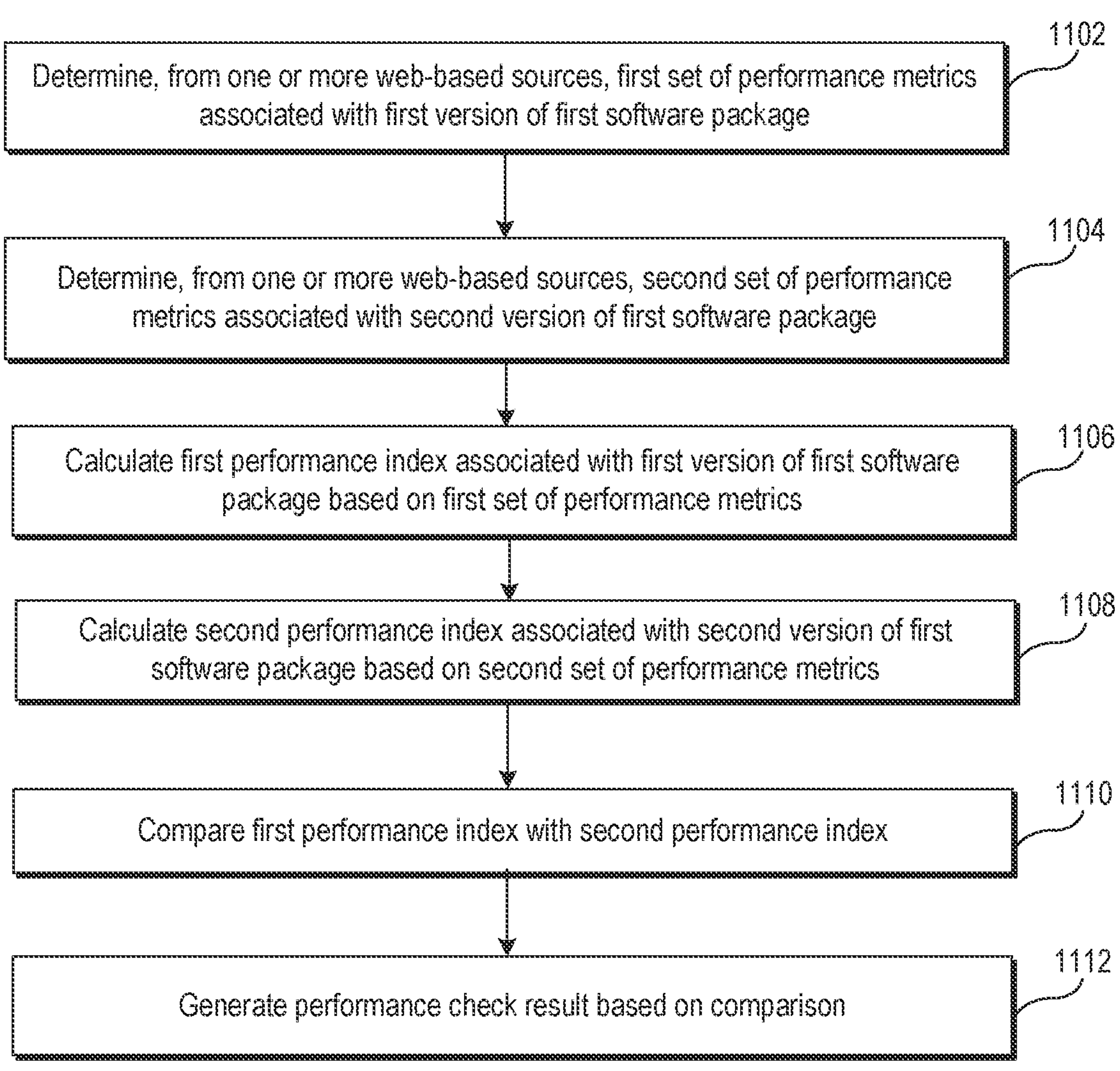

FIG. 11 illustrates a flowchart of an exemplary method for generation of performance check result for recommending version updates for software packages, according to at least one embodiment described in the present disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown a flowchart 1100. The method illustrated in the flowchart 1100 may start at 1102 and may be performed by any suitable system, apparatus, or device, such as by the system 102 of FIG. 1 or FIG. 2.

At 1102, a first set of performance metrics may be determined. In an embodiment, the system 102 may determine the first set of performance metrics from the one or more web-based sources 104. Each of such metrics may be associated with a performance of the first version of the first software package.

In an embodiment, the first set of performance metrics may include a first performance metric associated with a count of security issues or bugs that may be addressed in first version of the first software package, a second performance metric associated with a count of new features or enhancements that may be introduced in the first version of the first software package, and a third performance metric associated with a count of open-issues associated with the first version of the first software package. Details about the determination of the first set of performance metrics are provided, for example, in FIG. 12.

At 1104, a second set of performance metrics may be determined. In an embodiment, the system 102 may be configured to determine the second set of performance metrics from the one or more web-based sources 104. Each of the second set of performance metrics may be associated with a performance of the second version of the first software package.

In an embodiment, the second set of performance metrics may include a performance metric associated with a count of security issues or bugs that may be addressed in the second version of the first software package, a fifth performance metric associated with a count of new features or enhancements that may be introduced in the second version of the first software package, and a sixth performance metric associated with a count of open-issues associated with the second version of the first software package. Details about the determination of the first set of performance metrics are provided, for example, in FIG. 12.

At 1106, a first performance index may be calculated. In an embodiment, the system 102 may be configured to calculate the first performance index associated with the first version of the first software package. The first performance index may be calculated based on the determined first set of performance metrics. Specifically, a weight may be assigned to each of the first set of performance metrics to calculate the first performance index. For example, the first performance index may be calculated based on equation (1), which is given as follows:

$$PI_1 = W_1A_1 + W_2B_1 + W_3C_1 \tag{1}$$

where, $PI_1$ corresponds to the first performance index, $A_1$ corresponds to the first performance metric of the first set of performance metrics, $B_1$ corresponds to the second performance metric of the first set of performance metrics, $C_1$ corresponds to the third performance metric of the first set of performance metrics, $W_1$, $W_2$, $W_3$ corresponds to weighs assigned to $A_1$, $B_1$, and $C_1$ respectively, and $$W_1 + W_2 + W_3 = 1.$$

At 1108, a second performance index may be calculated. In an embodiment, the system 102 may be configured to calculate the second performance index associated with the second version of the first software package. The second performance index may be calculated based on the determined second set of performance metrics. Specifically, a weight may be assigned to each of the second set of performance metrics to calculate the second performance index. For example, the second performance index may be calculated based on equation (2), which is given as follows:

$$PI_2 = W_1A_2 + W_2B_2 + W_3C_2 \quad (2)$$

Where, $PI_2$ corresponds to the second performance index, $A_2$ corresponds to the fourth performance metric, $B_2$ corresponds to the fifth performance metric, $C_2$ corresponds to the sixth performance metric, $W_1$, $W_2$, $W_3$ corresponds to weighs assigned to $A_2$, $B_2$, and $C_2$ respectively, and $$W_1 + W_2 + W_3 = 1.$$

At 1110, the first performance index may be compared with the second performance index. If the second performance index is greater than the first performance index, then the performance of the second version of the first software package may be inferred to be better than the performance of the first version of the first software package. If the second performance index is less than the first performance index, then the performance of the first version of the first software package may be inferred to be better than the performance of the second version of the first software package.

At 1112, a performance check result may be generated. In an embodiment, the system 102 may generate the performance check result based on the comparison of the first performance index and the second performance index. The performance check result may indicate whether the performance of the second version is better than the first version of the first software package. The system 102 may determine the suitability of the second version as an update for the first version, based on the generated performance check result.

It should be noted that the flowchart 1100 may correspond to the performance check of the set of checks that may be executed. The performance check may be associated with the compatibility constraint of the set of constraints.

Control may pass to end. Although the flowchart 1100 is illustrated as discrete operations, such as 1102, 1104, 1106, 1108, 1110, and 1112. However, in certain embodiments, such discrete operations may be further divided into additional operations, combined into fewer operations, or eliminated, depending on the particular implementation without detracting from the essence of the disclosed embodiments.

Figure 12:
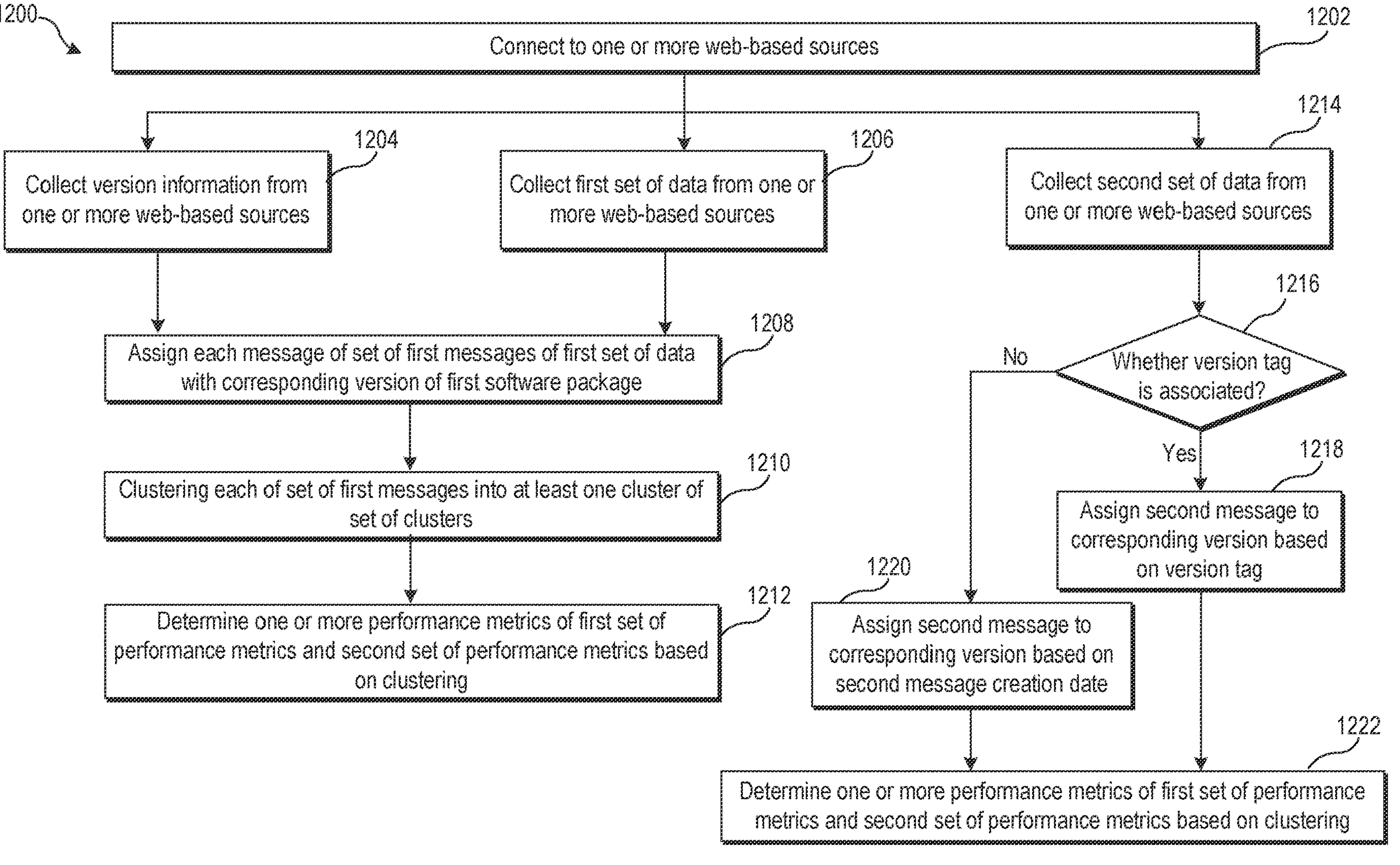
FIG. 12 illustrates a flowchart of an exemplary method for determination of performance metrics for generation of performance check result.

FIG. 12 illustrates a flowchart of an exemplary method for determination of performance metrics for generation of a performance check result, according to at least one embodiment described in the present disclosure. FIG. 12 is explained in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as by the system 102 of FIG. 1 or FIG. 2.

At 1202, a connection to the one or more web-based sources 104 may be established. In an embodiment, the system 102 may establish a connection to the one or more web-based sources 104. Such sources may include one or more web-based software hosting sources (e.g., GitHub®), one or more version control systems, one or more web-based software metadata storage services, or one or more websites. The system 102 may establish the connection between the system 102 and the one or more web-based sources 104 via the communication network 108. Details about the one or more web-based sources 104 are provided, for example, in FIG. 1.

At 1204, version information may be collected from the one or more web-based sources 104. In an embodiment, the system 102 may collect version information associated with each version of the first software package. For example, the version information may be collected for the first version and the second version of the first software package. The version information may include a version tag and a corresponding version date. The version tag may correspond to an identifier of the corresponding version and the version data may correspond to a public release date of the corresponding version. For example, if the first software package is "A" which may have two versions say "v1" and "v2" released on "Jan. 1, 2021" and "Jan. 1, 2022", then the version tags may be "v1" and "v2" and the version date may be "Jan. 1, 2021" and "Jan. 1, 2022", respectively.

At 1206, a first set of data may be collected from the one or more web-based sources 104. The first set of data may include a set of first messages, a set of first message labels, and a set of first message merged dates. The set of first message labels and the set of first message merged dates may be associated with the set of first messages.

In an embodiment, the first set of data may be associated with each version of the first software package. Specifically, the set of first messages may be associated with one or more changes introduced in the source code of a version of the first software package. For example, on GitHub®, each message of the set of first messages may correspond to a pull request message.

The set of first message labels may be associated with the set of first messages. Each label of the set of first labels may provide information about the corresponding message. For example, the set of labels may include "issues", "bug", "feature" "enhancement", and the like. By way of example, and not limitation, the labels such as "issues" and "bug" may indicate an unexpected problem or unintended behavior, and the labels such as "feature" and "enhancement" may indicate new features associated with the corresponding version. The set of first message merged dates may correspond to a date on which the set of first messages were created/updated on the one or more web-based sources 104.

In an embodiment, the set of first labels may be provided by an author of the corresponding set of first messages. In some instances, the author may only write the first message and may not add the first label to be associated with the corresponding first message. In such instances, the system 102 may apply a machine learning (ML) model on the first message to associate the first label with the first message. Details about the ML model are provided, for example, in FIG. 13.

At 1208, each message of the set of first messages may be assigned to a corresponding version. In an embodiment, the system 102 may assign each message of the set of first messages to a corresponding version of the first software package, based on the set of first message merged dates and the version information. Specifically, the system 102 may compare the first date with the version date to assign each message of the set of first messages to a corresponding version of the first software package.

At 1210, each of the set of first messages may be clustered. In an embodiment, the system 102 may cluster each of the set of first messages into at least one cluster of a set of clusters, based on a corresponding message label of the set of first message labels. For example, if the first message is "X feature is introduced" and the corresponding message label is "feature", then the first message may be included in the cluster corresponding to "feature" message label. The count of clusters may be same as the count of the labels in the set of first message labels.

In an embodiment, the system 102 may cluster the set of first messages based on the set of labels and version associated with the corresponding first message. In such an embodiment, the system 102 may create a cluster for each label of the set of labels. For example, if the first software package has 2 versions and the set of first message labels are 2, then 4 clusters (2 for the first version and 2 for the second version) may be created.

At 1212, one or more performance metrics of the first set of performance metrics and the second set of performance metrics may be determined. In an embodiment, the system 102 may determine one or more performance metrics of the first set of performance metrics and the second set of performance metrics, based on the clustering. The one or more performance metrics of the first set of performance metrics may include a first performance metric associated with a count of number of security issues or bugs that may be addresses in first version of the first software package and a second performance metric associated with a count of number of new features or enhancements that may be introduced in the first version of the first software package.

The one or more performance metrics of the second set of performance metrics may include a fourth performance metric associated with a count of number of security issues or bugs that may be addressed in the second version of the first software package, and a fifth performance metric associated with a count of number of new features or enhancements that may be introduced in the second version of the first software package. In an embodiment, the system 102 may count a number of first messages included in each cluster to determine the one or more performance metrics.

At 1214, a second set of data may be collected from the one or more web-based sources 104. The second set of data may include a set of second messages, a set of second message labels, and a set of second message creation dates. The set of second message labels and the set of second message merged dates may be associated with the set of second messages.

In an embodiment, the second set of data may be associated with each version of the first software package. Specifically, the set of second messages may be associated with one or more issues that may exist in the source code of a corresponding version of the first software package. For example, on GitHub®, each of the set of first messages may correspond to an issue.

At 1216, it may be determined that whether a version tag is associated with each of the set of second messages. In an embodiment, the version tag may be included in the set of second message labels associated with the set of second messages. In case the version tag is assigned to the second message, the control may be transferred to 1218. Otherwise, the control may be transferred to 1220.

At 1218, the system 102 may assign the second message to a corresponding version based on a pre-assigned version tag associated with corresponding second message. For example, if the pre-assigned version tag that is included in a second message label (associated with the second message) indicates that the version of the first software package is "1.0", then the system 102 may assign the second message to version "1.0".

At 1220, the system 102 may assign the second message to a corresponding version based on a second message creation date associated with the corresponding second message. For example, if the version tag that is included in a second message label (associated with the second message) indicates that the second message creation date is "01/02/2021", the version tag data associated with the version "v1" is "01/01/2021" and the version tag data associated with the version "v2" is "01/01/2022", then the system 102 may assign the second message to version "1.0". The assignment may be done because the release date for the version "v2" is after the second message creation date.

At 1222, one or more performance metrics of the first set of performance metrics and the second set of performance metrics may be determined. In an embodiment, the system 102 may determine the one or more performance metrics of the first set of performance metrics and the second set of performance metrics, based on the assignment of the second message to the corresponding version.

The one or more performance metrics of the first set of performance metrics may include a third performance metric associated with a count of open issues associated with the first version of the first software package. The one or more performance metrics of the second set of performance metrics may include a sixth performance metric associated with a count of open issues associated with the second version of the first software package. In an embodiment, the system 102 may count a number of second messages assigned to the corresponding version.

The system 102 may calculate the first performance index associated with the first version of the first software package, based on the first set of performance metrics. Similarly, the system 102 may calculate the second performance index associated with the second version of the first software package, based on the second set of performance metrics. Based on the calculated first performance index and the second performance index, the system 102 may generate the performance check result. Details about the calculation of the first performance index and the second performance index and generation of the performance result are provided, for example, in FIG. 11.

Control may pass to end. Although the flowchart 1200 is illustrated as discrete operations, such as 1202, 1204, 1206, 1208, 1210, 1212, 1214, 1216, 1218, 1220, and 1222. However, in certain embodiments, such discrete operations may be further divided into additional operations, combined into fewer operations, or eliminated, depending on the particular implementation without detracting from the essence of the disclosed embodiments.

Figure 13:
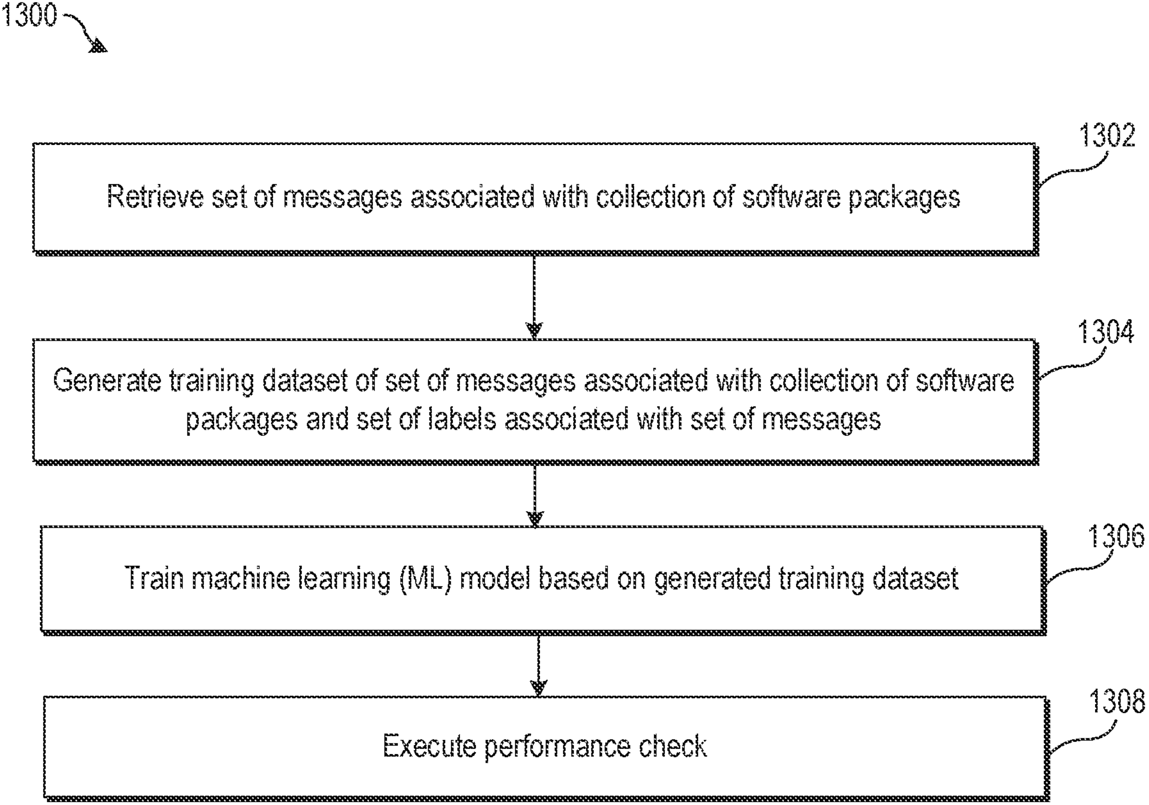
FIG. 13 illustrates a flowchart of an exemplary method for training of a machine learning (ML) model for generation of the performance check result.

FIG. 13 illustrates a flowchart of an exemplary method for training of a machine learning (ML) model for generation of the performance check result, according to at least one embodiment described in the present disclosure. FIG. 13 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, and FIG. 12. With reference to FIG. 13, there is shown a flowchart 1300. The method illustrated in the flowchart 1300 may start at 1302 and may be performed by any suitable system, apparatus, or device, such as by the system 102 of FIG. 1 or FIG. 2.

At 1302, a set of messages associated with a collection of software packages may be retrieved. In an embodiment, the system 102 may retrieve the set of messages associated with each package of the collection of software packages (hosted on the one or more web-based sources 104). The system 102 may determine a set of labels associated with each of the set of messages. With reference to GitHub® the set of messages may include, for example, issues associated with each package of the collection of software packages, pull request messages associated with each package, and discussion forums associated with each package. Each label may provide information about the corresponding message. For example, the set of labels may include "bug" and "enhancement". By way of example, and not limitation, the label "bug" may indicate an unexpected problem or unintended behavior and the label "enhancement" may indicate new features associated with the corresponding message.

At 1304, a training dataset may be generated. In an embodiment, the system 102 may generate a training dataset of the set of messages (associated with the collection of software packages) and the set of labels associated with the set of messages. The training dataset may include a plurality of training samples. Each training sample may include a pair of a message and a corresponding label.

At 1306, a ML model may be trained. In an embodiment, the system 102 may be configured to train the ML model based on the generated training dataset. The ML model may be trained to predict a label for a new message.

The ML model may be a computational network or a system of artificial neurons, arranged in a plurality of layers, as nodes. The plurality of layers of the ML model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the ML model. Outputs of each hidden layer may be coupled to inputs of at least one node in other layers of the ML model. Node(s) in the final layer may receive inputs from at least one hidden layer to output a result. The number of layers and the number of nodes in each layer may be determined from hyper-parameters of the ML model. Such hyper-parameters may be set before, while training, or after training the ML model on a training dataset.

Each node of the ML model may correspond to a mathematical function (e.g., a sigmoid function or a rectified linear unit) with a set of parameters, tunable during training of the ML model. The set of parameters may include, for example, a weight parameter, a regularization parameter, and the like. Each node may use the mathematical function to compute an output based on one or more inputs from nodes in other layer(s) (e.g., previous layer(s)) of the ML model. All or some of the nodes of the ML model may correspond to same or a different mathematical function.

In training of the ML model, one or more parameters of each node of the ML model may be updated based on whether an output of the final layer for a given input (from the training dataset) matches a correct result based on a loss function for the ML model. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The ML model may include electronic data, which may be implemented as, for example, a software component of an application executable on the system 102. The ML model may rely on libraries, external scripts, or other logic/instructions for execution by a processing device, such as the processor 202. The ML model may include code and routines configured to enable a computing device, such as the processor 202 to perform one or more operations for prediction of a label for the new message. Additionally, or alternatively, the ML model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

At 1308, a performance check may be executed. In an embodiment, the system 102 may execute a performance check of a set of checks based on application of the trained ML model on a set of first messages associated with the second version of the first software package. The performance check may be executed to determine a suitability of the second version as a suitable update for the first version of the software package (e.g., OSS package). In an embodiment, the execution of the performance check corresponds to generation of the performance check result as described in FIG. 11.

Control may pass to end. Although the flowchart 1300 is illustrated as discrete operations, such as 1302, 1304, 1306, and 1308. However, in certain embodiments, such discrete operations may be further divided into additional operations, combined into fewer operations, or eliminated, depending on the particular implementation without detracting from the essence of the disclosed embodiments.

Figure 14:
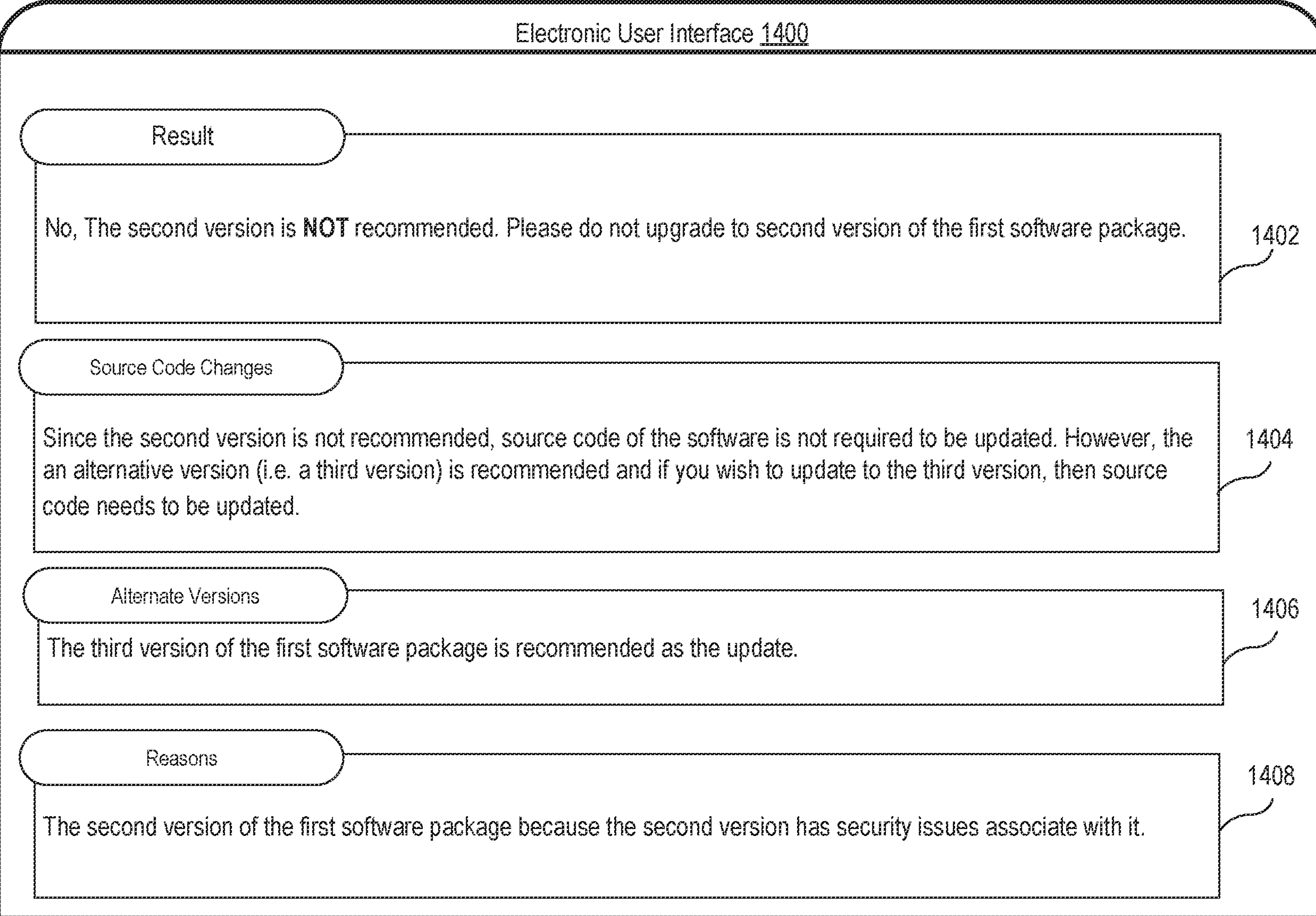
FIG. 14 illustrates an example electronic user interface (UI) for displaying user-assistive information on an electronic device.

FIG. 14 illustrates an example electronic user interface (UI) for displaying user-assistive information on an electronic device, according to at least one embodiment described in the present disclosure. FIG. 17 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13. With reference to FIG. 14, there is shown an electronic UI 1400, which may be an example implementation of the electronic UI 110 of FIG. 1. The electronic UI 1400 may be displayed on the electronic device 106 based on the generated compatibility result.

On the electronic UI 1400, there is shown a set of UI elements, such as a first UI element 1402, a second UI element 1404, a third UI element 1406, and a fourth UI element. The first UI element 1402 is labelled as, for example, "Result". The first UI element 1402 may be a label window that may indicate the whether the second version is suitable as an update for the first version. In case the second version is suitable for an update for the first version, then a 'yes' may be displayed in the first UI element 1402. In case the second version is not suitable for the update for the first version, then a 'no' may be displayed in the first UI element 1402.

In case the second version is suitable for an update for the first version, the second UI element 1404 and the fourth UI element 1408 may be displayed on the electronic UI 1400. In case the second version is not suitable for an update for the first version, the third UI element 1406 and the fourth UI element 1408 may be displayed on the electronic UI 1400.

The second UI element 1404 is labelled as, for example, "Source Code Changes". The second UI element 1404 may be a textbox that may display a first recommendation to update the source code of the software so as to be source-code compatible with the second version of the first software package. In case no code changes are required, the system 102 may be configured to display a first recommendation to not update the source code of the software.

The third UI element 1406 is labelled as, for example, "Alternate Versions". The third UI element 1406 may be a textbox that may display a second recommendation to upgrade to the second version of the first software package.

The fourth UI element 1408 is labelled as, for example, "Reasons". The fourth UI element 1408 may be a textbox or label that displays a set of reasons for recommending or not recommending the second version of the first software package as an update for the first version. In an embodiment, the system 102 may be configured to generate the set of reasons in a natural language format (i.e., human-understandable).

Figure 15:
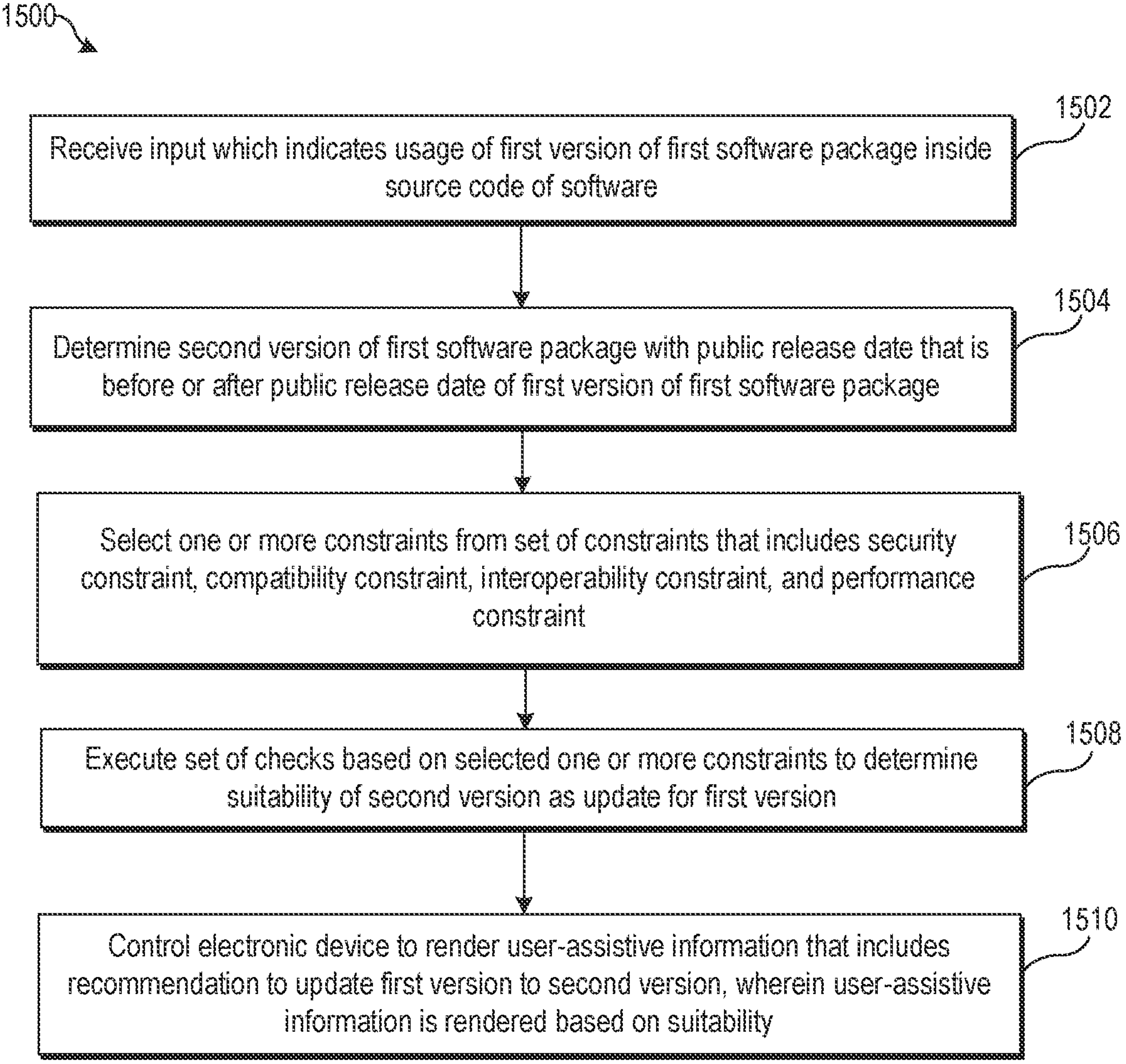
FIG. 15 illustrates a flowchart of an exemplary method for recommending version updates for software packages.

FIG. 15 illustrates a flowchart of an exemplary method for recommending version updates for software packages, according to at least one embodiment described in the present disclosure. FIG. 15 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14. With reference to FIG. 15, there is shown a flowchart 1500. The method illustrated in the flowchart 1500 may start at 1502 and may be performed by any suitable system, apparatus, or device, such as by the system 102 of FIG. 1 or FIG. 2.

At 1502, the input may be received. The received input may indicate the usage of the first version of the first software package inside the source code of the software. The details about the reception of the input are provided in FIG. 1 and FIG. 3.

At 1504, the second version of the first software package may be determined. The second version have a public release date that is before or after a public release date of the first version of the first software package. The details about the determination of the second version of the first software package are provided in FIG. 4 and FIG. 5.

At 1506, the one or more constraints from the set of constraints may be selected. The set of constraints may include a security constraint, a compatibility constraint, an interoperability constraint, and a performance constraint. The details about the selection of the one or more constraints are provided, for example, in FIG. 1 and FIG. 3.

At 1508, the set of checks may be executed. The set of checks may be executed based on the selected one or more constraints to determine a suitability of the second version as an update for the first version. The set of checks for the second version may be executed in an order of priority and may include of a security check, a compatibility check, an interoperability check, and a performance check. The order of priority may indicate a first priority associated with the security check, a second priority associated with the compatibility check, a third priority associated with the interoperability check, and a fourth priority associated with the performance check. Details about the execution of the set of checks are provided, for example, in FIG. 6, FIG. 7, FIG. 8, FIG. 9, FIG. 10, FIG. 11, and FIG. 12.

At 1510, the electronic device 106 may be controlled. The electronic device 106 may be controlled to render user-assistive information that includes the recommendation to update the first version to the second version. The user-assistive information may be rendered based on the suitability. The details about displaying the user-assistive information are provided from FIG. 14.

Control may pass to end. Although the flowchart 1500 is illustrated as discrete operations, such as 1502, 1504, 1506, 1508, and 1510. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store instructions that, in response to being executed, cause a system (such as the system 102) to perform operations. The operations may include receiving an input which indicates a usage of a first version of a first software package inside a source code of a software. The operation may further include determining a second version of the first software package with a public release date that is before or after a public release date of the first version of the first software package. The operation may further include selecting one or more constraints from a set of constraints that includes a security constraint, a backward compatibility constraint, an interoperability constraint, and a performance constraint. The operations may further include executing a set of checks based on the selected one or more constraints to determine a suitability of the second version as an update for the first version. The operations may further include controlling an electronic device (such as the electronic device 106) to render user-assistive information that includes a recommendation to update the first version to the second version, wherein the user-assistive information is rendered based on the suitability.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:

receiving an input, from a hardware processor of a system, which indicates a usage of a first version of a first software package inside a source code of a software;

determining a second version of the first software package with a release date that is before or after a release date of the first version of the first software package;

selecting, from a set of constraints, a plurality of constraints comprising a security constraint, a compatibility constraint, an interoperability constraint, and a performance constraint;

executing a set of checks based on the plurality of constraints to determine a suitability of the second version as an update for the first version; and controlling an electronic device to render user-assistive information that includes a recommendation to update the first version to the second version, the user-assistive information is rendered based on the suitability, the selecting includes selecting the security constraint as a hard constraint and selecting the compatibility constraint, the interoperability constraint, and the performance constraint as soft constraints, and among the soft constraints, a relevance of each of the compatibility constraint and the interoperability constraint is more than that of the performance constraint, the execution of the set of checks includes an execution of a compatibility check by:

determining, based on the input, first information about the first version of the first software package;

extracting a set of data from a plurality of web-based sources, based on the first information, the set of data comprises of:

one or more changes in a source code of the second version of the first software package, and second information about the one or more changes in the second version of the first software package;

executing a set of operations including one or more pattern searching operations on the set of data; and generating a compatibility check result based on the execution of the set of operations, the suitability of the second version as the update for the first version is determined based on the generated compatibility check result, the plurality of web-based sources comprising software hosting sources, version control systems, and software metadata storage services.

2. The method according to claim 1, further comprising:

controlling the electronic device to display options that categorize the set of constraints into a set of categories;

receiving a user input via the electronic device; and selecting an option from the displayed options based on the received user input, wherein the one or more constraints are selected based on the selected option.

3. The method according to claim 1, wherein the selecting includes selecting the security constraint, the compatibility constraint, and the interoperability constraint as hard constraints and selecting the performance constraint as a soft constraint.

4. The method according to claim 1, wherein
the set of checks for the second version are executed in an order of priority and comprises of a security check, a compatibility check, an interoperability check, and a performance check, and
the order of priority indicates a first priority associated with the security check, a second priority associated with the compatibility check, a third priority associated with the interoperability check, and a fourth priority associated with the performance check.

5. The method according to claim 1, wherein the execution of the set of checks includes an execution of a security check by:
querying one or more vulnerability databases to detect a presence of one or more security issues in the second version of the first software package;
receiving a response from the one or more vulnerability databases based on the querying; and
generating a security check result based on the received response,
wherein the suitability of the second version is determined based on the generated security check result.

6. The method according to claim 1, wherein the extracted set of data comprises of:
a first file that includes the source code of the second version of the first software package,
a second file that includes the second information about the one or more changes in the second version of the first software package,
a third file that includes a description of the first software package, and
a set of first messages associated with the one or more changes introduced in the source code of the second version of the first software package.

7. The method according to claim 1, wherein the execution of the set of operations further comprises:
executing a first pattern searching operation of the set of operations on the set of data to detect one or more tags associated with a compatibility in the set of data;
extracting one or more sentences associated with the one or more tags; and
determining a first set of API names or function names mentioned in the one or more sentences;
determining whether the first set of API names or function names include names of one or more first APIs, or first functions used in the source code of the software and provided by the first version of the first software package,
wherein the compatibility check result is generated further based on a determination.

8. The method according to claim 1, wherein the execution of the set of operations further comprises:
collecting, from the extracted set of data, one or more code chunks which corresponds to the one or more changes in the source code of the second version of the first software package with respect to the source code of the first version of the first software package; and
executing a second pattern searching operation of the set of operations on the one or more code chunks to generate the compatibility check result.

9. The method according to claim 1, wherein the execution of the set of checks includes an execution of an interoperability check by:
determining, based on the input, package information about a first version of a second software package that is used to implement one or more second APIs or functions inside the source code of the software;
generating an interoperability check result based on the package information, wherein the interoperability check result indicates an interoperability between the second version of the first software package and the first version of the second software package; and
determining the suitability of the second version as an update for the first version of the first software package, further based on the generated interoperability check result.

10. The method according to claim 9, further comprising:
determining a collection of software packages from the plurality of web-based sources, wherein the collection of software packages includes the first software package and the second software package;
collecting software package data associated with each software package of the collection of software packages, wherein the software package data includes a set of dependencies and one or more package managers for each software package listed in the set of dependencies;
generating a dependency tree based on the collected software package data;
identifying, based on the dependency tree, a set of software package combinations that is used in the collection of software packages; and
generating a dataset that includes software package combinations included in the set of software package combinations and information related to the software package combinations.

11. The method according to claim 10, further comprising:
determining a presence of a first software package combination between the second version of the first software package and the first version of the second software package in the dataset; and
generating the interoperability check result further based on the presence,
wherein the suitability of the second version as the update for the first version is determined further based on the generated interoperability check result.

12. The method according to claim 1, further comprising:
determining, from the plurality of web-based sources, a first set of performance metrics associated with the first version of the first software package;
determining, from the plurality of web-based sources, a second set of performance metrics associated with the second version of the first software package;
calculating a first performance index associated with the first version of the first software package based on the first set of performance metrics;
calculating a second performance index associated with the second version of the first software package based on the second set of performance metrics;
comparing the first performance index with the second performance index; and
generating a performance check result based on the comparison,
wherein the suitability of the second version as the update for the first version is determined further based on the generated performance check result.

13. The method according to claim 12, further comprising:
collecting, from the plurality of web-based sources, version information associated with each version of the first software package,
wherein the version information includes a version tag and a corresponding version date;

collecting, from the plurality of web-based sources, a set of first messages, a set of first message labels, and a set of first message merged dates, wherein the set of first message labels and the set of first message merged dates are associated with the set of first messages;

assigning each message of the set of first messages with a corresponding version of the first software package, based on the set of first message merged dates and the version information;

clustering each of the set of first messages into at least one cluster of a set of clusters based on a corresponding message label of the set of first message labels;

determining one or more performance metrics of the first set of performance metrics and the second set of performance metrics based on the clustering; and calculating the first performance index and the second performance index associated with the first software package, based on the one or more performance metrics.

14. The method according to claim 12, further comprising:

collecting, from the plurality of web-based sources, a set of second messages, a set of second message labels, and a set of second message creation dates associated with the first software package;

determining whether each message of the set of second messages is assigned a version tag;

assigning the version tag to each message of the collected set of second messages based on at least one of a pre-assigned version tag and the set of second message creation dates;

determining one or more performance metrics of the first set of performance metrics and the second set of performance metrics based on the assignment; and calculating the first performance index and the second performance index associated with the first software package, based on the one or more performance metrics.

15. The method according to claim 1, further comprising:

generating a training dataset of a set of messages associated with a collection of software packages and a set of labels associated with the set of messages, wherein the collection of software packages includes the first software package;

training a machine leaning (ML) model on the generated training dataset, wherein the ML model is trained to predict a label for a new message; and executing a performance check of the set of checks based on application of the trained ML model on a set of first messages associated with the second version of the first software package to determine the suitability of the second version.

16. The method according to claim 1, wherein the user-assistive information comprises one or more of:

a first recommendation to update the source code of the software so as to be source-code compatible with the second version of the first software package, a second recommendation to upgrade to the second version of the first software package, and a set of reasons for recommending or not recommending the second version of the first software package as the update to the first version.

17. A non-transitory computer-readable storage medium configured to store instructions that, in response to being executed, causes a system to perform operations, the operations comprising:

receiving an input, from a hardware processor of a system, which indicates a usage of a first version of a first software package inside a source code of a software;

determining a second version of the first software package with a release date that is before or after a release date of the first version of the first software package;

selecting, from a set of constraints, a plurality of constraints comprising a security constraint, a compatibility constraint, an interoperability constraint, and a performance constraint;

executing a set of checks based on the plurality of constraints to determine a suitability of the second version as an update for the first version; and controlling an electronic device to render user-assistive information that includes a recommendation to update the first version to the second version, the user-assistive information is rendered based on the suitability, the selecting includes selecting the security constraint as a hard constraint and selecting the compatibility constraint, the interoperability constraint, and the performance constraint as soft constraints, and among the soft constraints, a relevance of each of the compatibility constraint and the interoperability constraint is more than that of the performance constraint, the execution of the set of checks includes an execution of a compatibility check by:

determining, based on the input, first information about the first version of the first software package;

extracting a set of data from a plurality of web-based sources, based on the first information, the set of data comprises of:

one or more changes in a source code of the second version of the first software package, and second information about the one or more changes in the second version of the first software package;

executing a set of operations including one or more pattern searching operations on the set of data; and generating a compatibility check result based on the execution of the set of operations, the suitability of the second version as the update for the first version is determined based on the generated compatibility check result, the plurality of web-based sources comprising software hosting sources, version control systems, and software metadata storage services.

18. A system, comprising:

a hardware processor configured to:

receive an input which indicates a usage of a first version of a first software package inside a source code of a software;

determine a second version of the first software package with a release date that is before or after a release date of the first version of the first software package;

select, from a set of constraints, a plurality of constraints comprising a security constraint, a compatibility constraint, an interoperability constraint, and a performance constraint;

execute a set of checks based on the plurality of constraints to determine a suitability of the second version as an update for the first version; and control an electronic device to render user-assistive information that includes a recommendation to update the first version to the second version, the user-assistive information is rendered based on the suitability, the selecting includes selecting the security constraint as a hard constraint and selecting the compatibility constraint, the interoperability constraint, and the performance constraint as soft constraints, and among the soft constraints, a relevance of each of the compatibility constraint and the interoperability constraint is more than that of the performance constraint, the execution of the set of checks includes an execution of a compatibility check by:

determining, based on the input, first information about the first version of the first software package;

extracting a set of data from a plurality of web-based sources, based on the first information, the set of data comprises of:

one or more changes in a source code of the second version of the first software package, and second information about the one or more changes in the second version of the first software package;

executing a set of operations including one or more pattern searching operations on the set of data; and generating a compatibility check result based on the execution of the set of operations, the suitability of the second version as the update for the first version is determined based on the generated compatibility check result, the plurality of web-based sources comprising software hosting sources, version control systems, and software metadata storage services.

* * * * *